F. L. JEFFERIES & W. SPAIN.
FILLING APPARATUS.
APPLICATION FILED SEPT. 10, 1917.

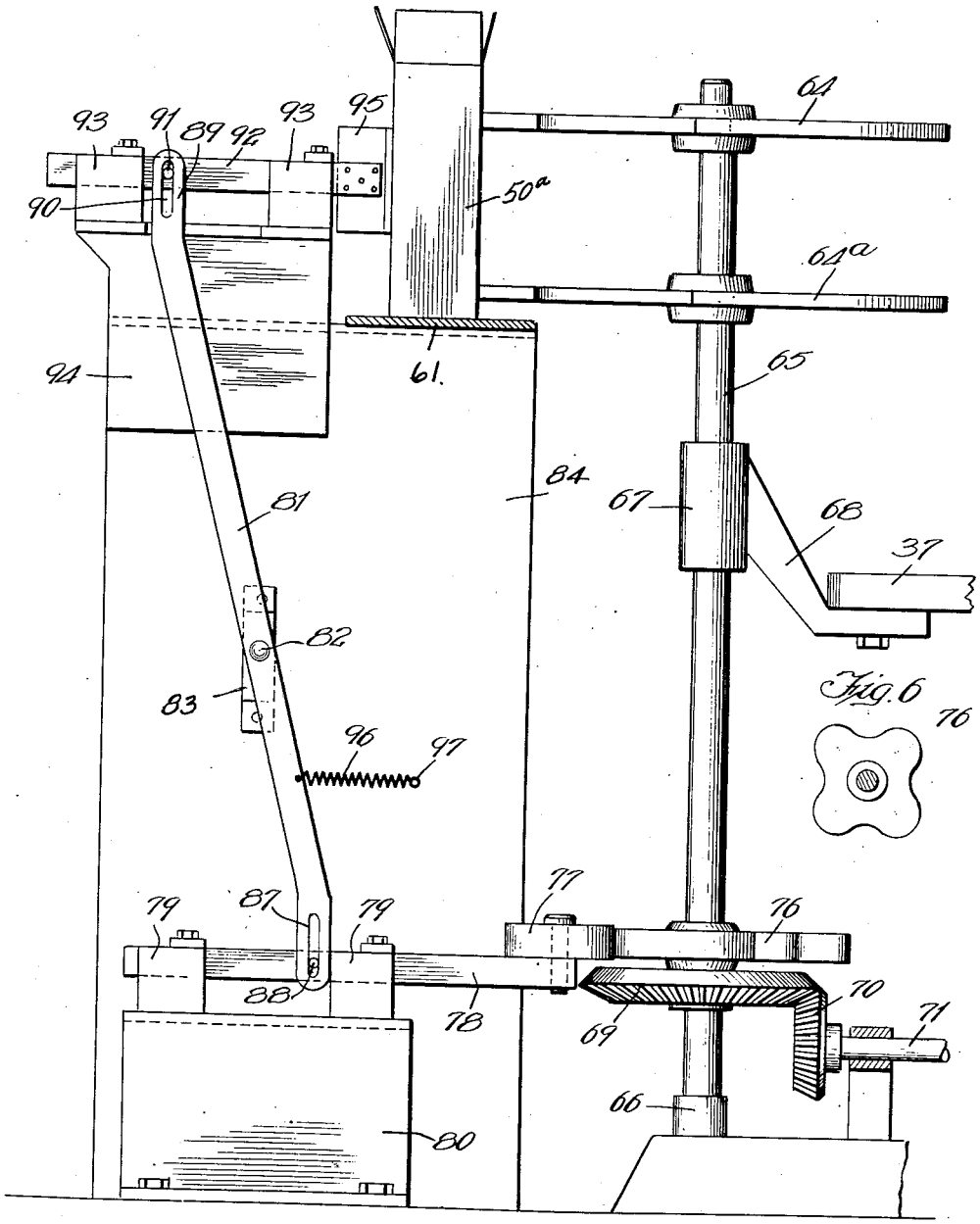

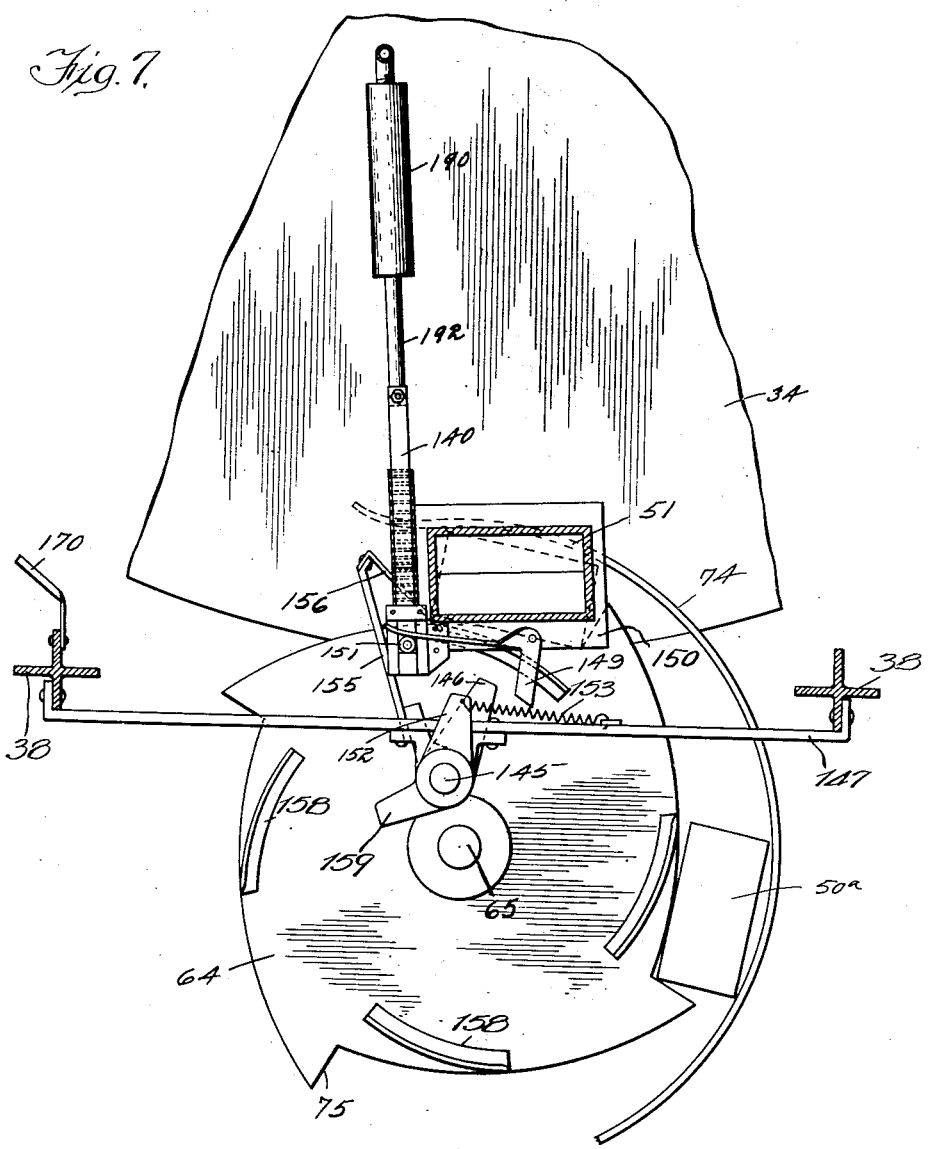

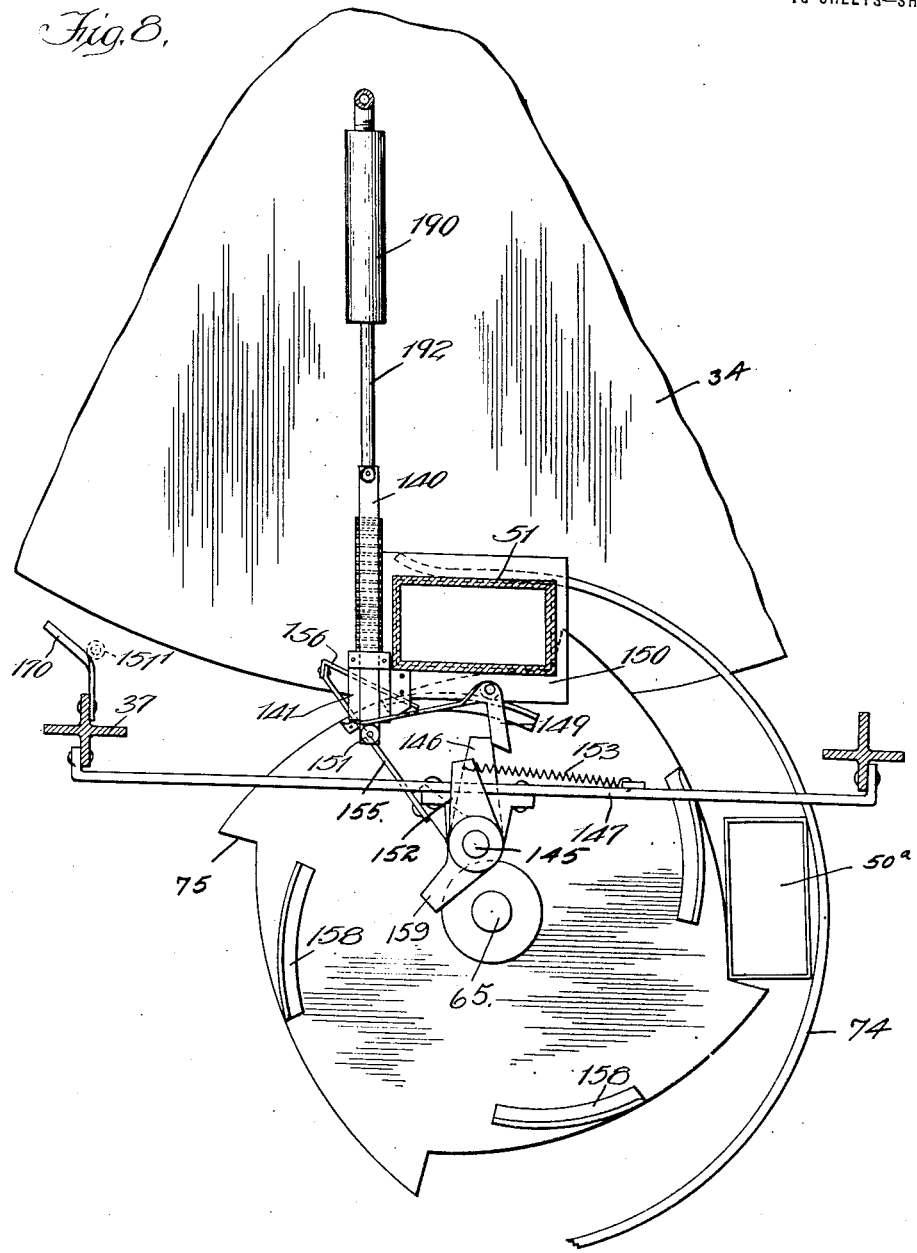

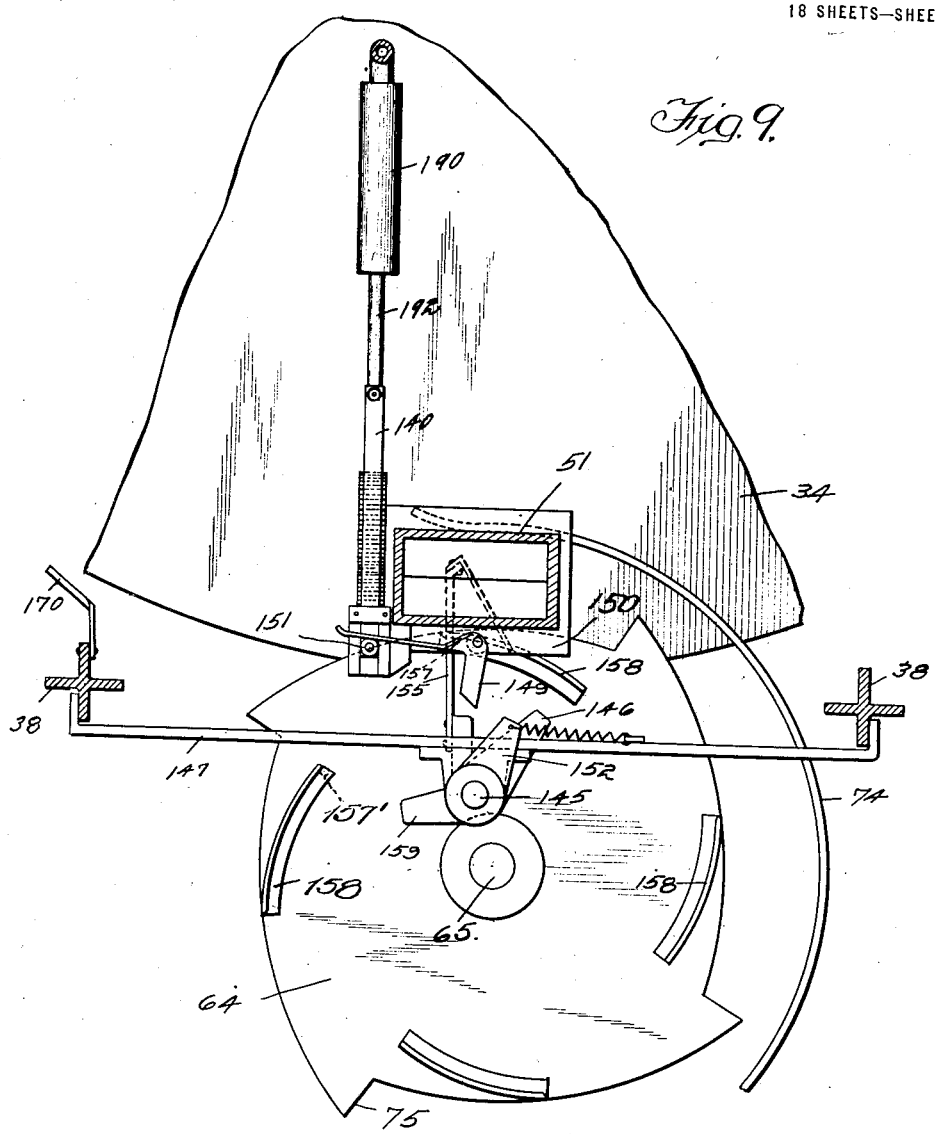

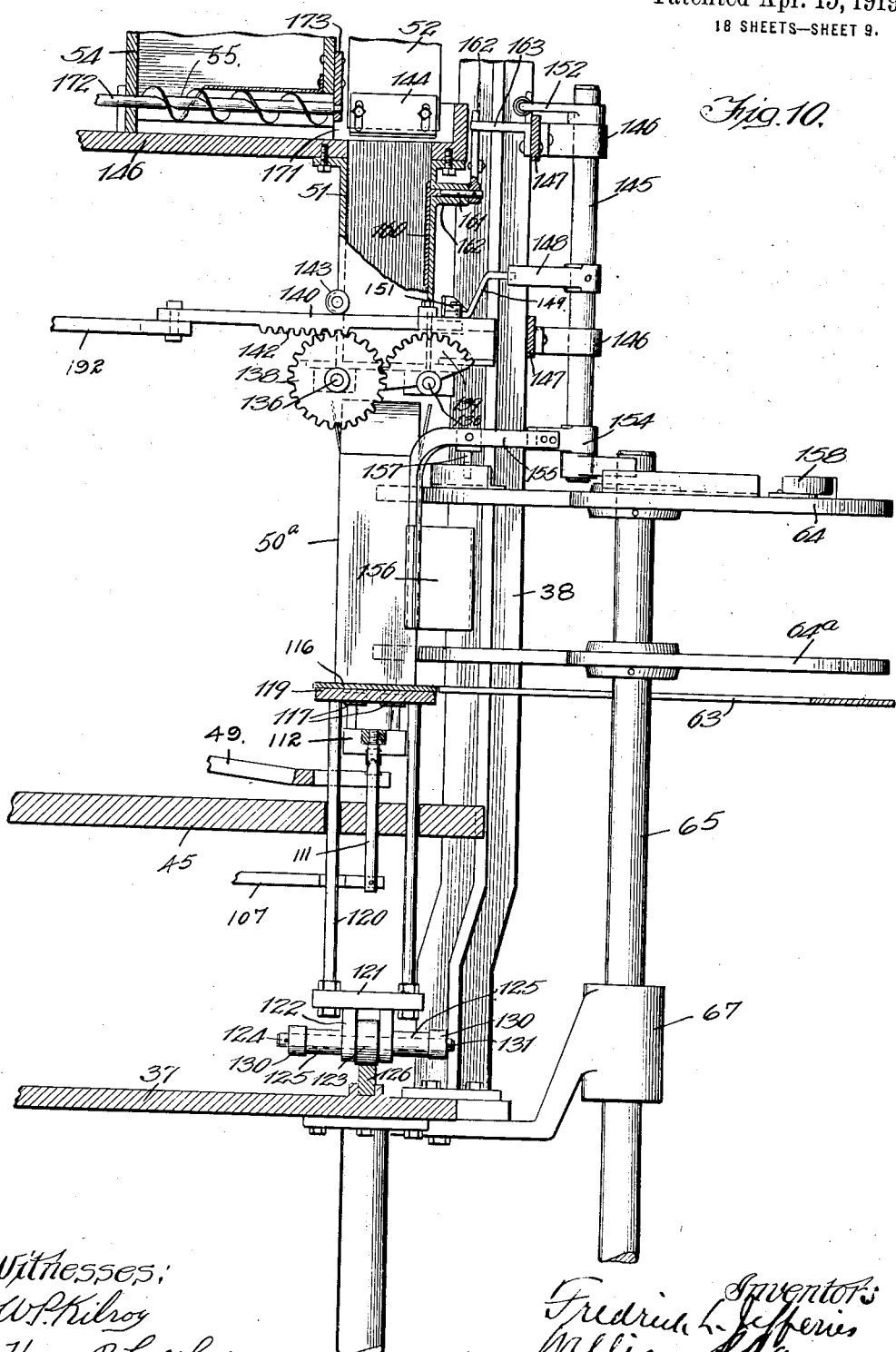

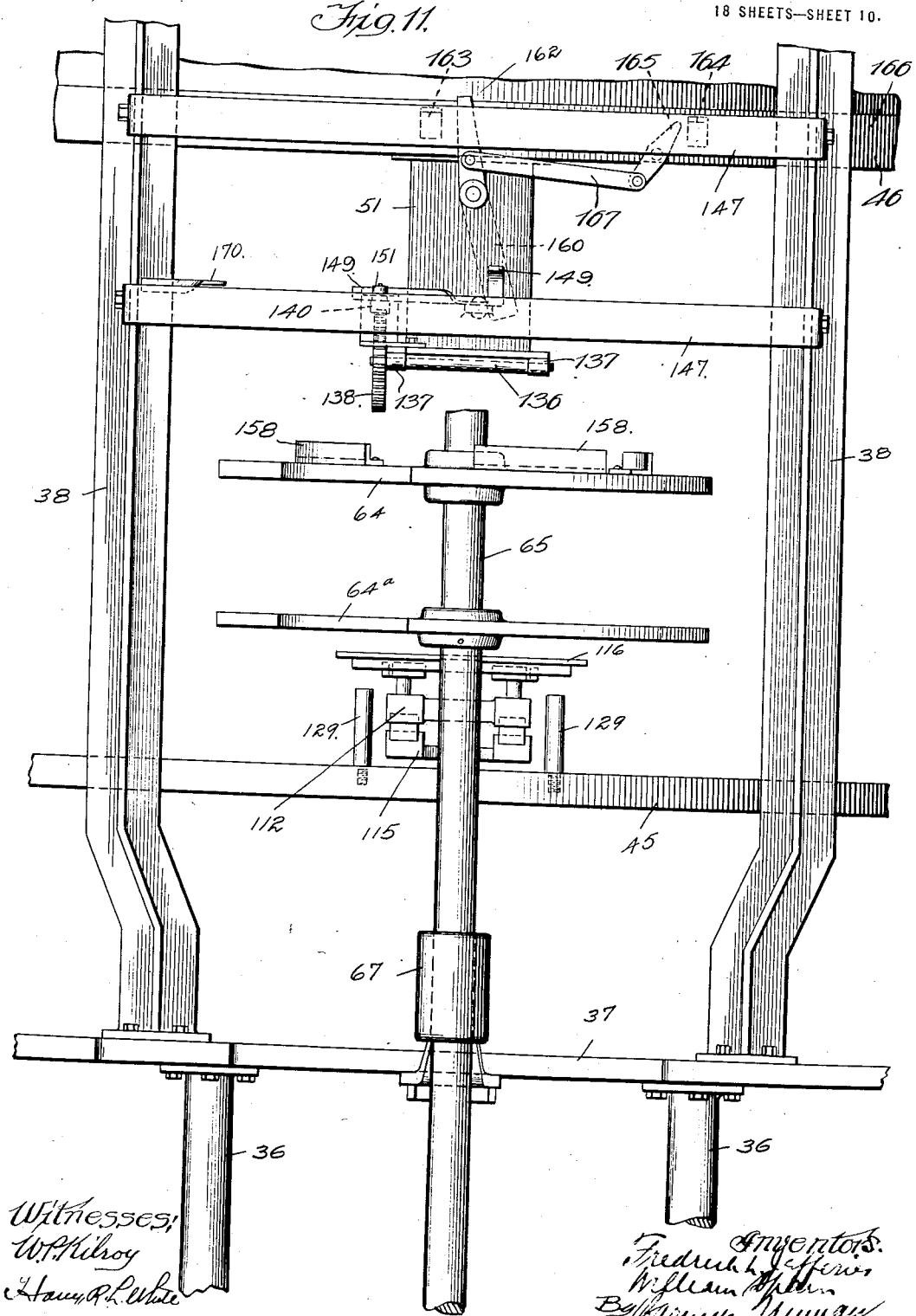

1,300,274.

Patented Apr. 15, 1919.
18 SHEETS—SHEET 11.

WITNESSES:
W. P. Kilroy
Harry R. L. White

INVENTORS
Fredrick L. Jefferies
William Spain
BY
Barnes Truman
ATTORNEYS.

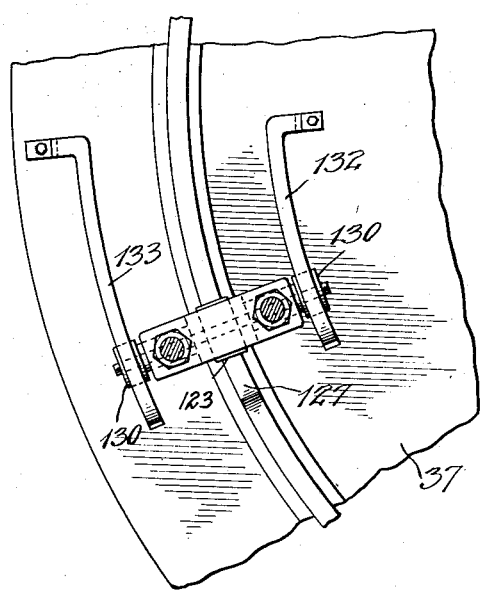
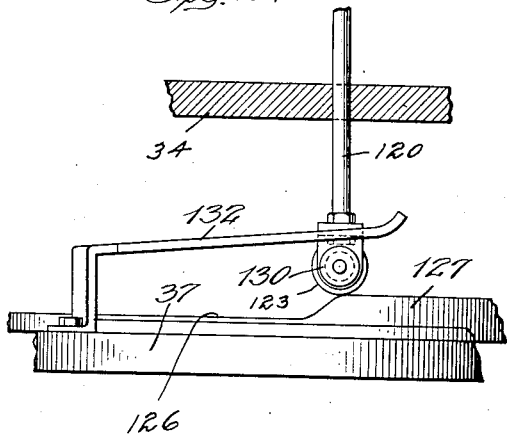
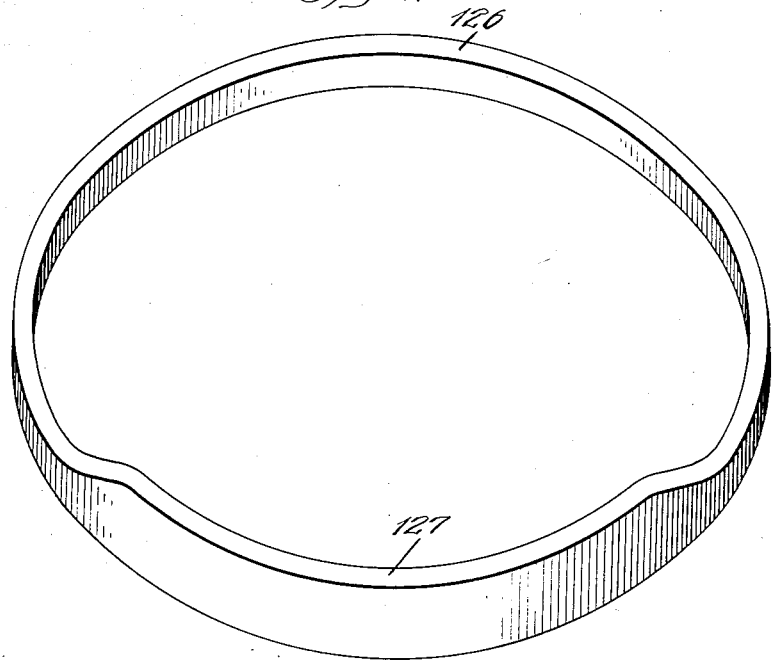

F. L. JEFFERIES & W. SPAIN.
FILLING APPARATUS.
APPLICATION FILED SEPT. 10, 1917.
1,300,274.
Patented Apr. 15, 1919.
18 SHEETS—SHEET 13.
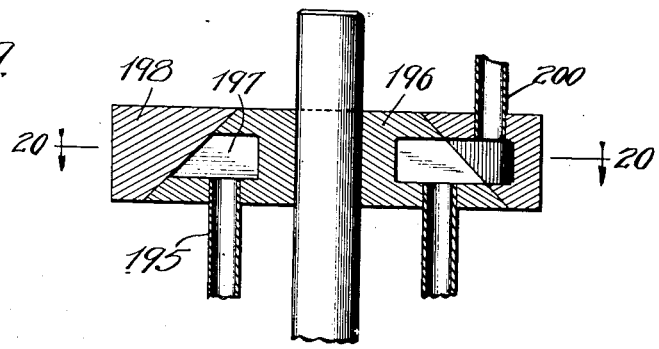
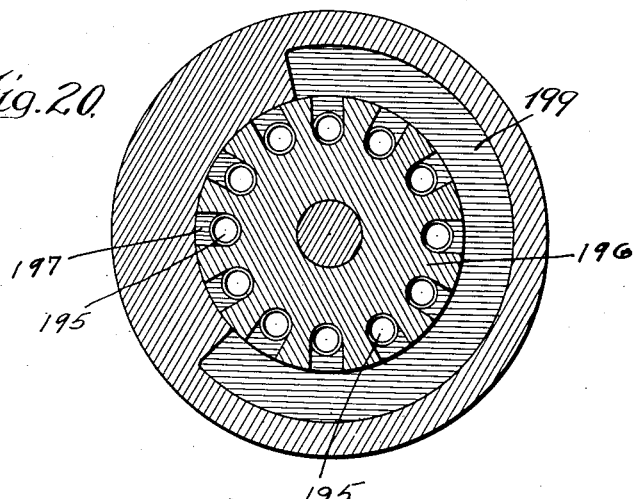
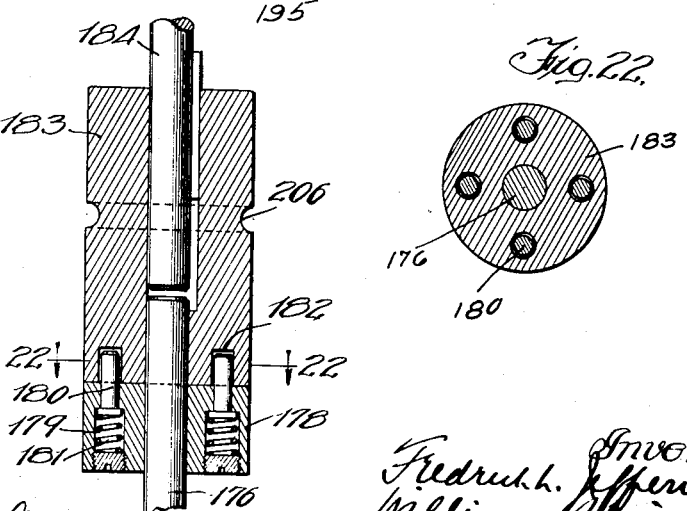

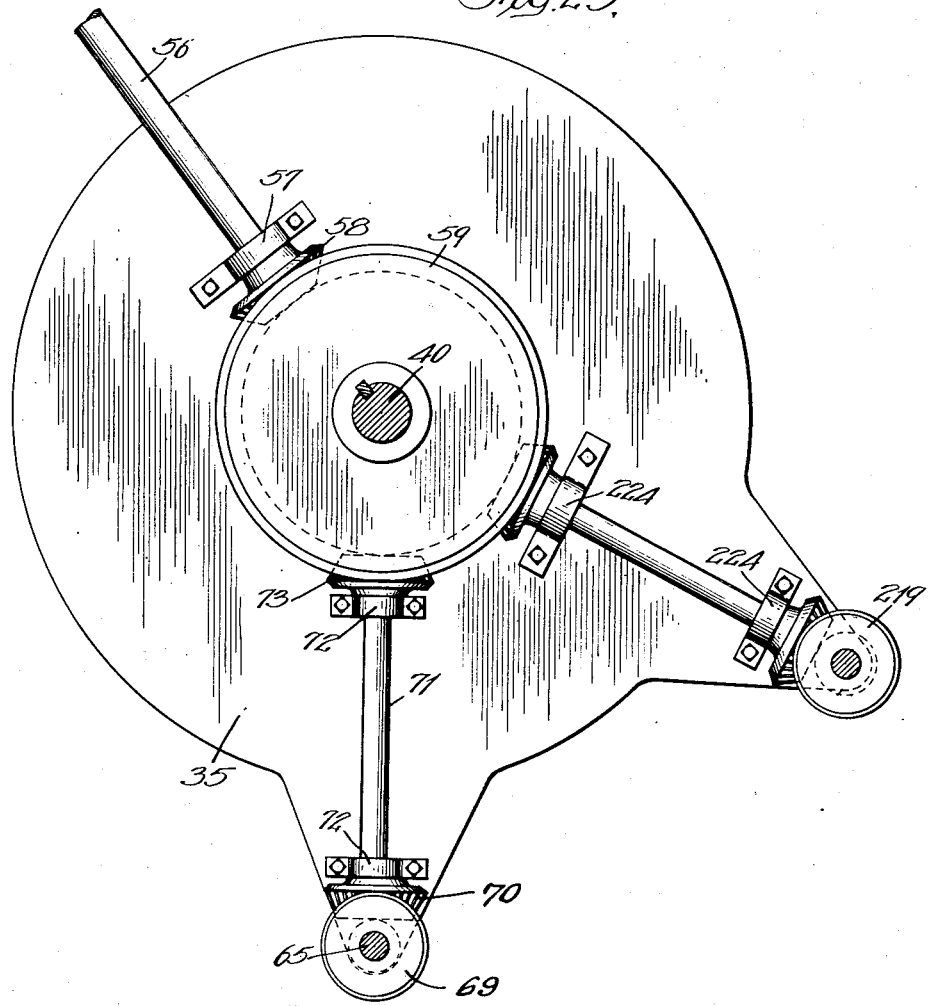

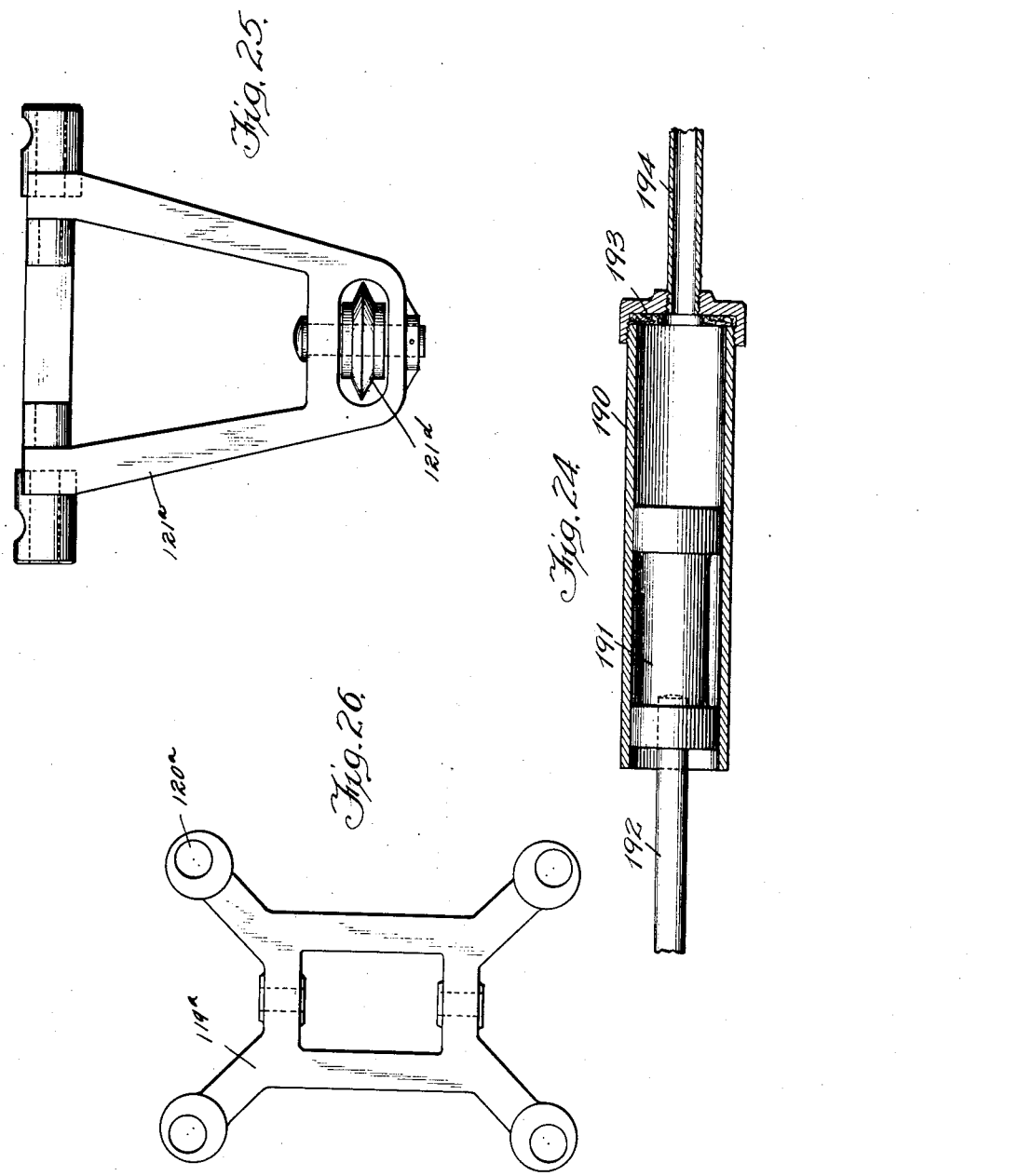

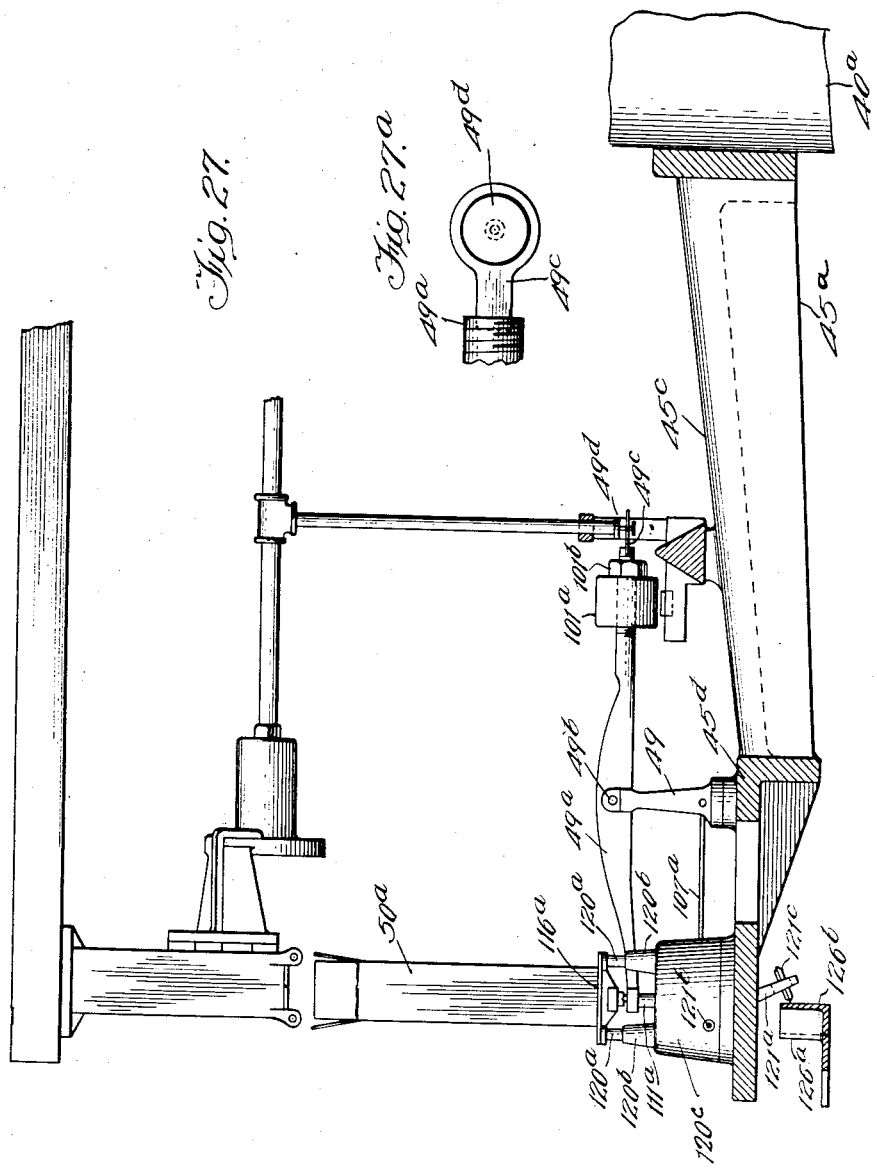

F. L. JEFFERIES & W. SPAIN.
FILLING APPARATUS.
APPLICATION FILED SEPT. 10, 1917.
1,300,274.
Patented Apr. 15, 1919.
18 SHEETS—SHEET 17.
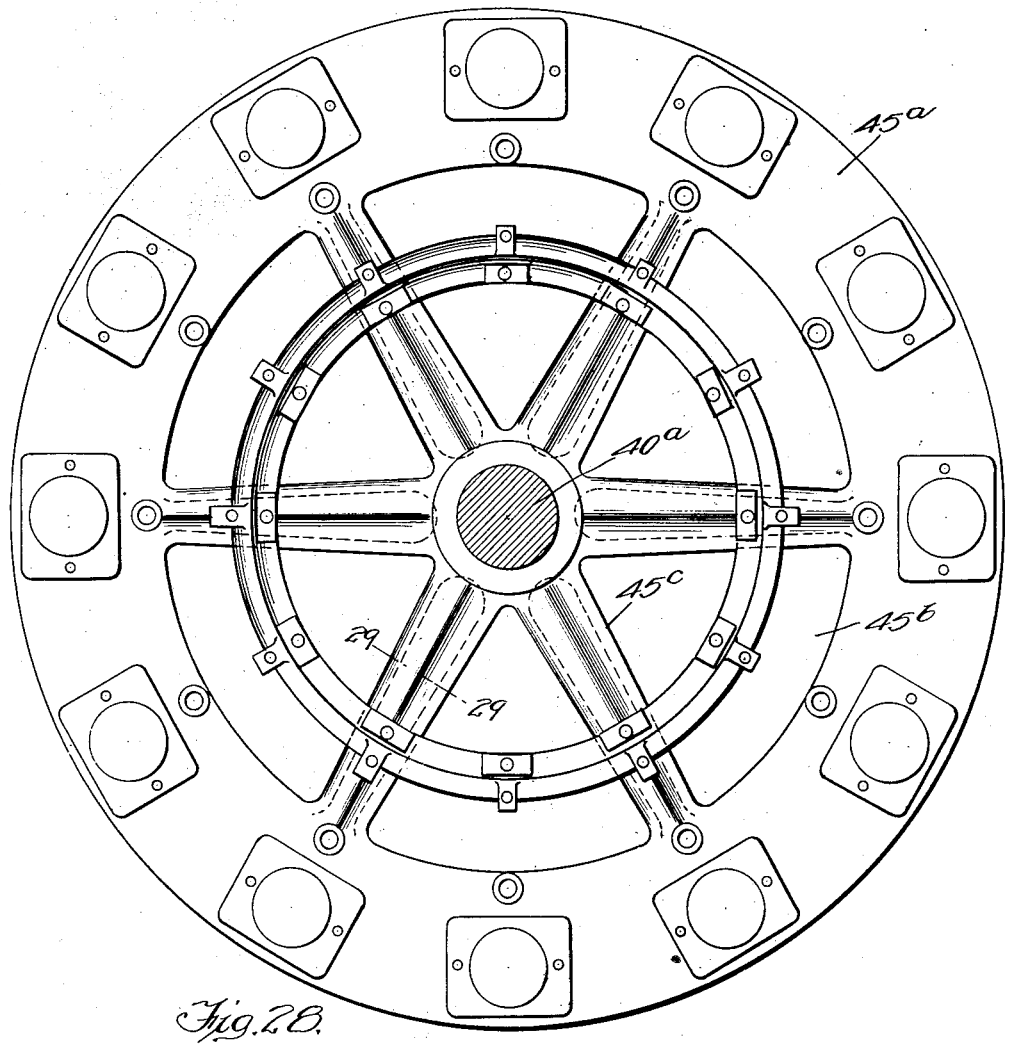
Fig. 28.
Fig. 29.

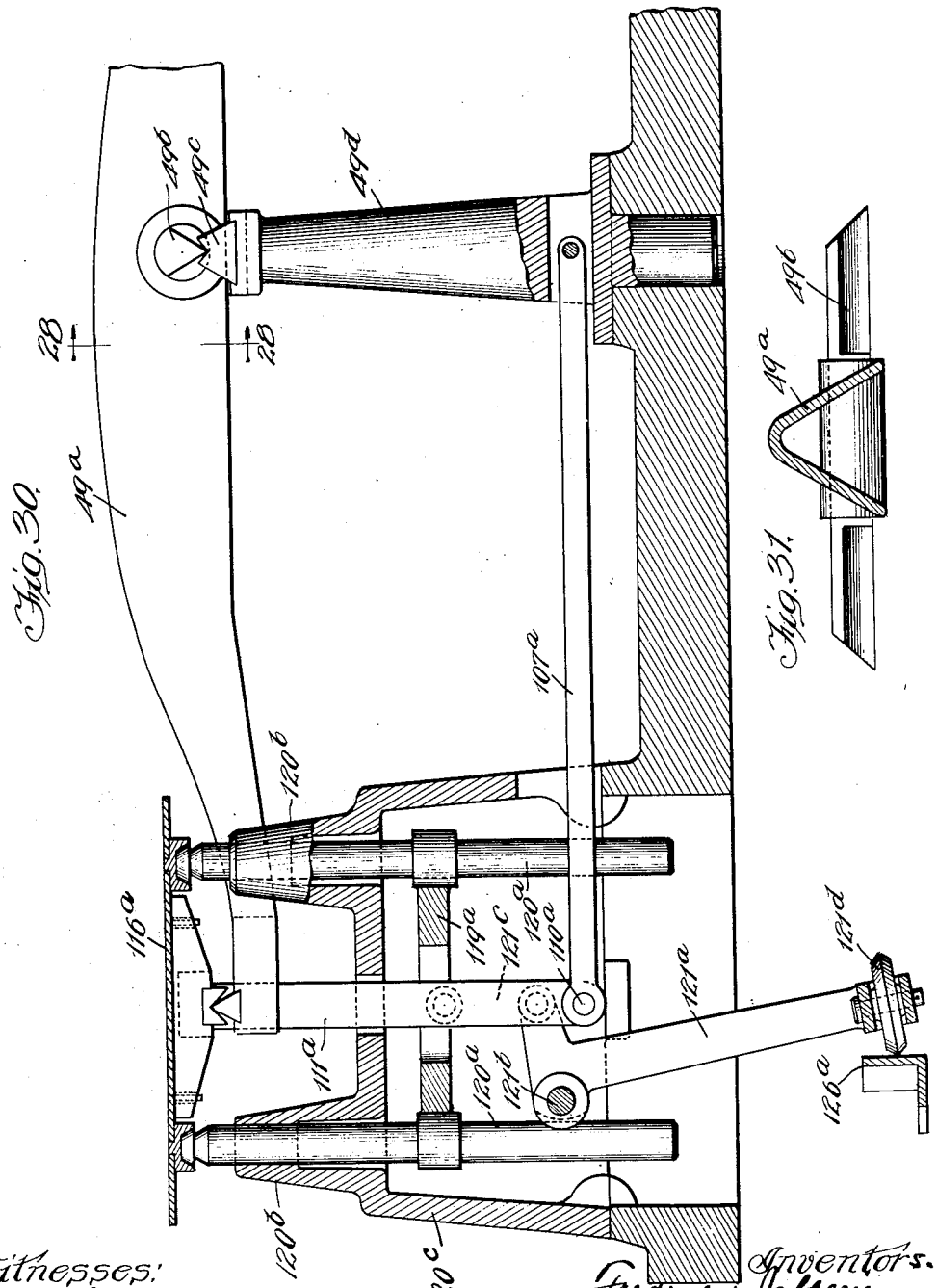

UNITED STATES PATENT OFFICE.

FREDRICK L. JEFFERIES AND WILLIAM SPAIN, OF RIVERSIDE, ILLINOIS, ASSIGNORS TO CORN PRODUCTS REFINING COMPANY, A CORPORATION OF NEW JERSEY.

FILLING APPARATUS.

1,300,274.  Specification of Letters Patent.  Patented Apr. 15, 1919.

Application filed September 10, 1917. Serial No. 190,545.

*To all whom it may concern:*

Be it known that we, FREDRICK L. JEFFERIES and WILLIAM SPAIN, citizens of the United States, residing at Riverside, in the county of Cook and State of Illinois, have invented certain new and useful Improvements in Filling Apparatus, of which the following is a specification.

Our invention relates to filling or packaging apparatus, and a primary object of the invention is to provide a machine for automatically filling cartons, or other receptacles, with dry material, such as starch, in quantities measured by weight, and to so construct said machine that this operation is performed accurately, expeditiously and economically.

The invention consists in certain novel and improved constructions, arrangements and devices for carrying out the above stated objects, together with certain associated mechanisms for feeding the receptacles into the machine, discharging the same therefrom, controlling the feeding of the material so that there shall be no spilling or wastage, and for warning the operator in case any given package is under weight.

It will be understood that while the machine is intended particularly for the packaging of starch, its use is not confined to this material. It should be further understood that while the invention in its preferred embodiment involves the use of a combination of a number of different mechanisms which coöperate to give the result desired, it will be quite possible to attain some of the purposes of our invention without employing all of the instrumentalities which go to make up the machine in the complete form disclosed herein.

The drawings hereto annexed illustrate a typical embodiment of the invention which, however, is subject to modification so far as structural details are concerned. Certain possible modifications have, in fact, been shown and will be described. In the drawings, Figure 1 is an elevation of the machine, with certain parts in section, looking toward the side on which the empty cartons are fed into the machine.

Fig. 5 is a side elevation of the carton feeding mechanism.

Fig. 6 is a detail view of the cam for operating the carton feeding mechanism.

Figs. 7 and 8 are detail plan views of a part of the carton feeding mechanism and one of the charging pockets with associated parts, these two figures showing the same operative elements in different relative positions.

Fig. 9 is a diagrammatic plan view of certain of the same parts shown in the positions which they assume in case there is no carton on the scale plate.

Fig. 10 is a sectional elevation of the mechanisms shown in the preceding three figures.

Fig. 11 is a front elevation of the same mechanisms.

Figs. 16, 17 and 18 are detail views of cam mechanisms for controlling the movements of a device for lifting the scale plate from the scale at the time the carton is fed into the machine and supporting the same during a portion of the filling of the carton; Fig. 16 being a view, in perspective, of the cam which raises this device; Fig. 17, a sectional plan view of the cams for moving said device to its inoperative position; Fig. 18, a side view of one of the last named cams.

Figure 4:
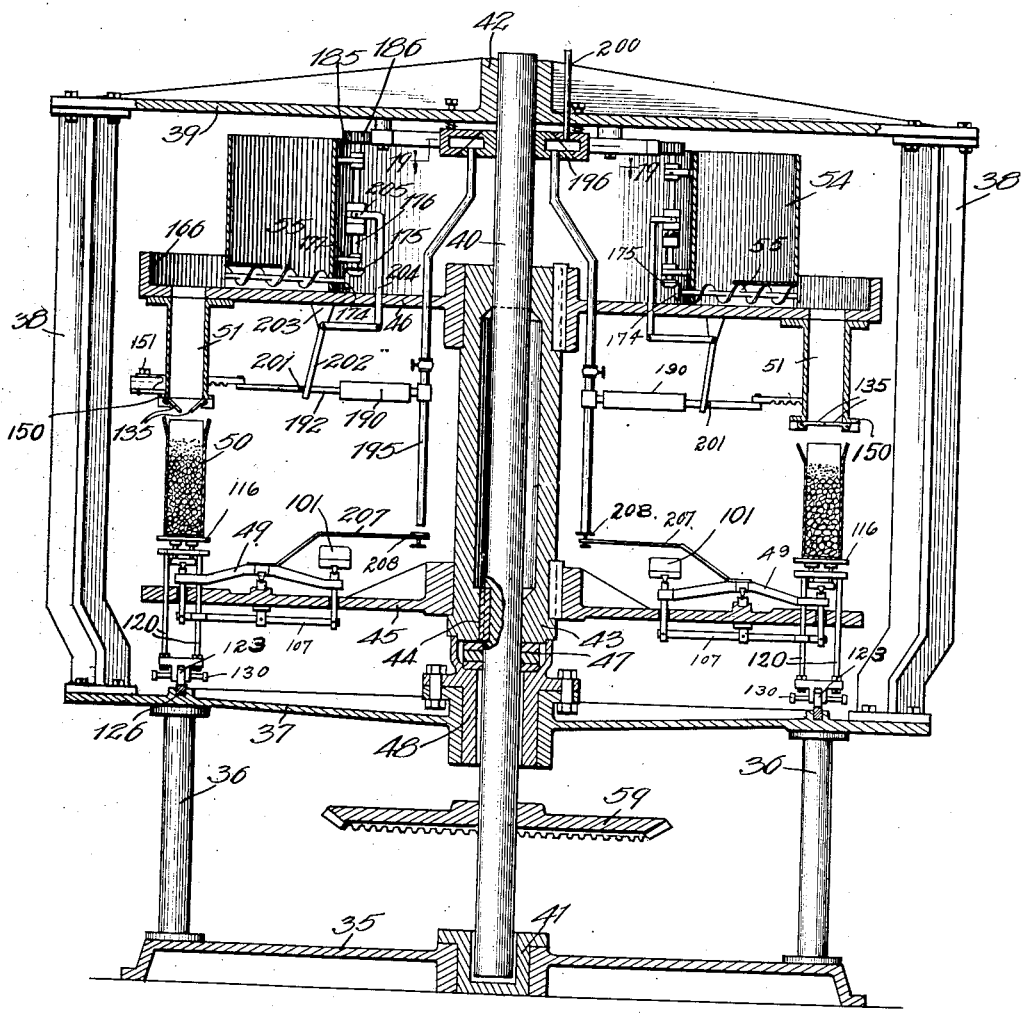
Fig. 4 is a sectional view on line 4—4 of Fig. 3.

Fig. 19 is a detail vertical sectional view on line 19—19 of Fig. 4, of a part of the connection between the vacuum motors and the air exhausting device (not shown).

Fig. 20 is a sectional plan on line 20—20 of Fig. 19.

Fig. 21 is a detail vertical section of a clutch employed for governing the feed of the material.

Fig. 22 is a sectional plan on line 22—22 of Fig. 21.

Fig. 23 is a sectional plan taken through the lower part of the machine to show the driving mechanism for the machine and the associated carton feeding and discharge mechanisms.

Fig. 24 is a longitudinal sectional view of one of the vacuum motors above referred to, and Figs. 25 to 28, inclusive, are views illustrating certain modifications; Fig. 25, being a side view of the cam actuated element for operating the scale plate lifter in the modified construction; Fig. 26, a plan view of a part of this lifting device; Fig. 27, a side elevation, with parts in section, of the modified construction; Fig. 28, a plan view of the same; Fig. 29, a cross sectional view on line 29—29 of Fig. 28; Fig. 30, a fragmentary sectional elevation on a radial line of one of the scales, and Fig. 31, a cross sectional view on line 31—31 of Fig. 30.

Like characters of reference designate like parts in the several figures of the drawings.

*General organization.*

The cartons, or other receptacles, are filled while supported on a circular revoluble structure. The empty cartons are automatically fed into place on this rotary structure. As soon as a carton is put in place on the machine it receives a charge of starch of measured volume. The weight of this charge is somewhat less than the desired weight of material which the carton is intended to contain. As the carton moves around its circular course with the rotation of the machine, additional starch is fed into it until the proper weight has been reached. The cartons are supported by a plurality of radially arranged scales and mechanism is provided, actuated by the balancing of the scales, for shutting off the feed of starch at the proper time. The filled cartons are then successively discharged from the machine. Preferably the charges introduced into the cartons by the primary filling operation consist of lumps. The secondary filling operation, whereby the material in the cartons is brought up to the proper weight, uses preferably a finer starch which can be more readily fed in a continuous stream than the lumps and which, because of its finely divided character, makes it possible to accurately fill the cartons with the required amount of material measured by weight.

The stationary framework of the machine consists of a base 35, uprights 36 supporting a lower spider 37, uprights 38 carried on the spider 37, and an upper spider 39 resting on the uprights 38.

The rotating portion of the machine comprises a central shaft 40 mounted in a bearing 41 in the base 35 and in a bearing 42 in the upper spider 39, a hub 43 keyed at 44 to the shaft 40, a lower table 45 fixed to the hub 43, and an upper table 46 secured to the upper end of the hub. The hub bears upon thrust rings 47 arranged in a bearing cup 48 secured to the lower spider 37. The scales 49 for weighing the cartons 50 and their contents are supported by the table 45. The charging pockets 51 for the primary filling operation are secured to the under side of table 46. 52 is the lump starch hopper, fed by pipe 53, from which the charging pockets 51 are filled in succession, the hopper being secured to the upper spider 39. The fine starch bin 54 is angular in shape and is carried on the upper table 46. Associated with each charging pocket is a screw conveyer 55, arranged within the fine starch hopper 54, for feeding the fine starch into the carton through the charging pocket after the latter has deposited its primary charge in the carton.

The revoluble structure, consisting of shaft 40 and the parts rigidly connected therewith, is driven by a drive shaft 56 (Fig. 23), the inner end of which is supported in a bearing 57 on the base 35 and carries a bevel pinion 58 meshing with a bevel gear 59 keyed to shaft 40.

*Mechanism for feeding the empty cartons into the machine,* (Figs. 1, 2, 3, 5 to 11 and 23.)

The empty cartons, designated 50ª, are fed by means of a belt conveyer 60 upon a slide 61, the slide and conveyer being furnished at opposite sides with retaining rails 62 designed to keep the cartons in line. The end of the slide or track 61 is curved, as indicated at 63, and projects over the lower table 45. 64, 64ª are notched forwarding wheels connected with a shaft 65 which turns in a bearing 66 on the base 35, and in a bearing 67 provided by bracket 68 on the lower spider 37. Shaft 65 carries a bevel gear 69 meshed by bevel pinion 70 on a shaft 71 mounted in bearings 72 (Fig. 23) on the base 35, and provided at its inner end with a bevel pinion 73 meshed with the pinion 59 on the central shaft 40 of the machine. 74 is a curved guide rail which partly surrounds the forwarding wheels so as to hold the cartons in engagement with the notches 75 thereof.

Figure 1:
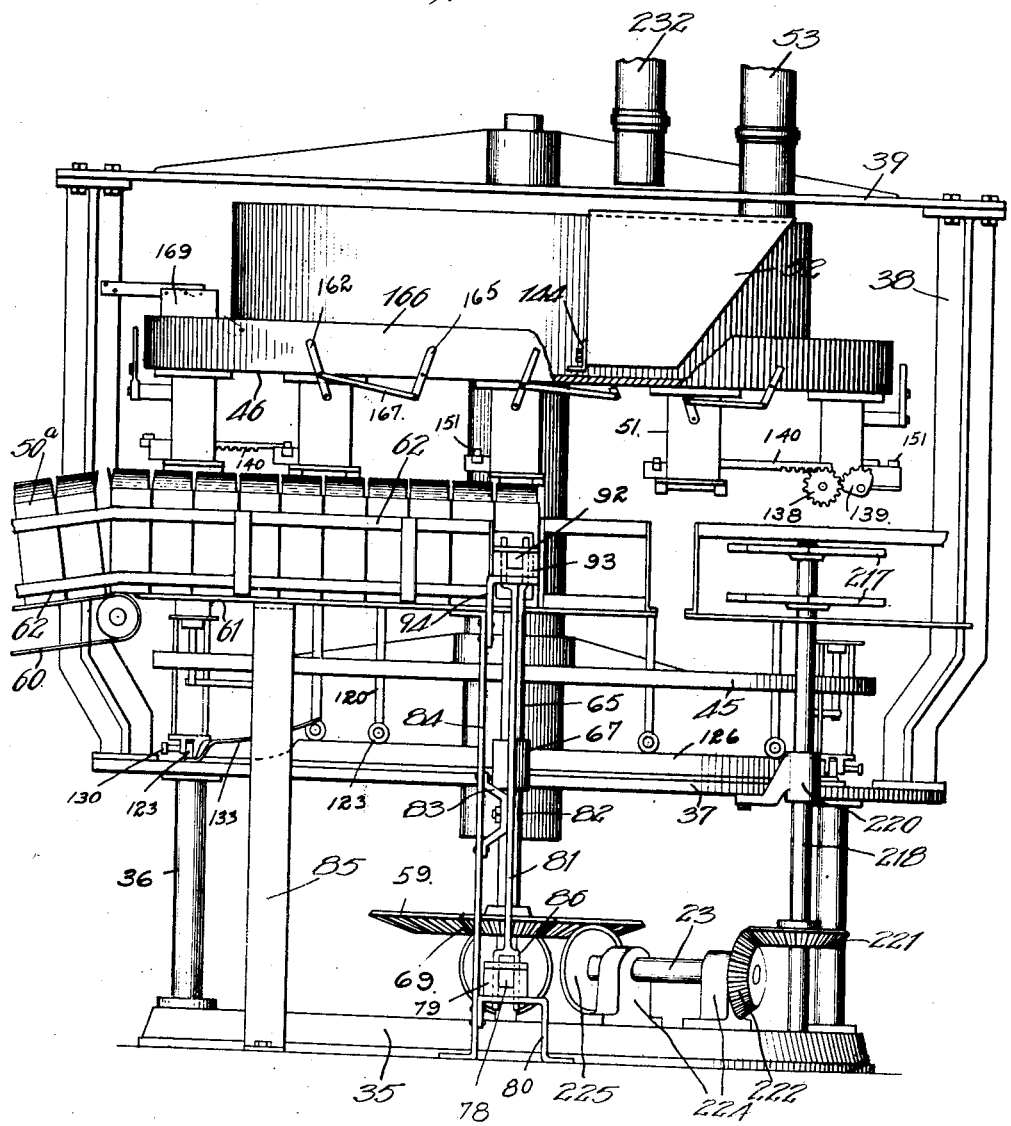

The cartons are successively moved into position to be engaged by the notches of the forwarding wheels by the following mechanism: 76 (Figs. 5 and 6) is a cam on shaft 65 adapted to bear against a roller 77 pivoted to a slide 78 mounted in guides 79 on a support 80. 81 is a lever pivoted at 82 to a bracket 83 on an upright member 84 which forms a support for the track 61, the other end of the track being supported by another upright 85 (Fig. 1). The lower end of lever 81 is forked, as shown at 86, and extends over the slide 78, the fork being formed with slots 87 to receive a pin 88 on the slide 78. The upper end of lever 81 is formed with a similar fork 89 slotted at 90 to engage a pin 91 on a slide 92 which moves in guides 93, 93, arranged on a bracket 94 on the upright member 84. The slide 92 is provided with a follower 95 angular in cross section (Figs. 3 and 5) which is adapted to bear against the cartons successively and push them toward the machine so as to be engaged by the notches of the forwarding wheel 64. 96 is a spring secured at 97 to the upright 84 and to the lever 81, the function of the spring being to hold the roller 77 on slide 78 against cam 76. The curved retaining rail 74 is provided at its outer end with an angular stop 98 for the cartons which, it will be understood, are pushed over to this position through operation of the belt conveyer while the follower 95 is in its retracted position.

*The scales,* (Figs. 1, 2, 4, 10, 12, 14 to 18.)

Figure 12:
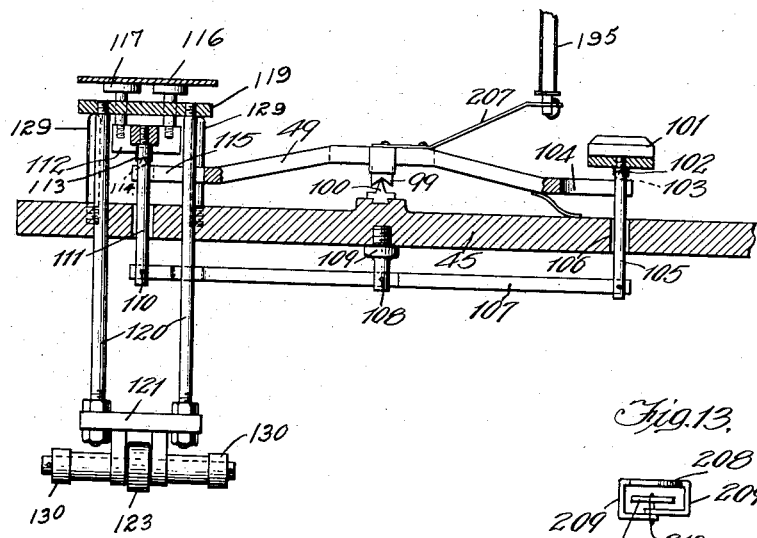
Fig. 12 is a sectional view of one of the scales.
Figure 13:
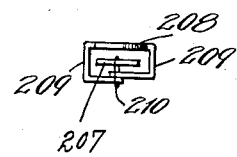
Fig. 13 is a detail view, in elevation, of the valve, carried by the scale, for controlling the operation of the vacuum motor which governs the delivery of material to the carton.
Figure 14:
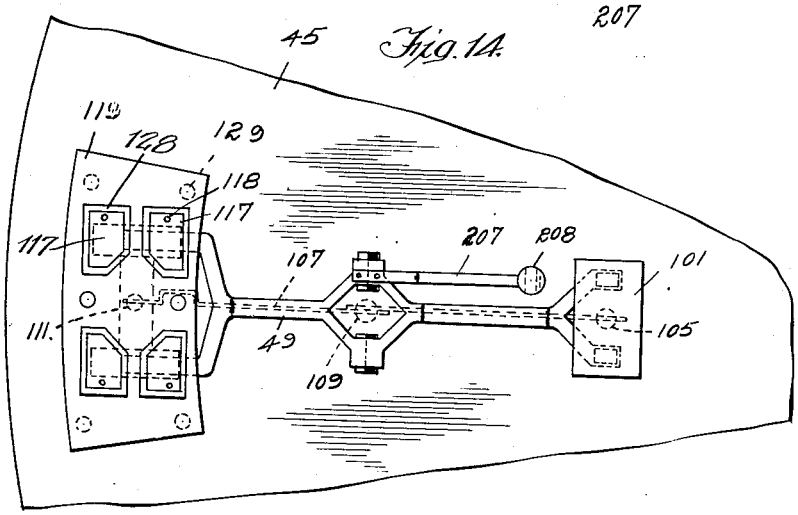
Fig. 14 is a plan view of a scale.
Figure 15:
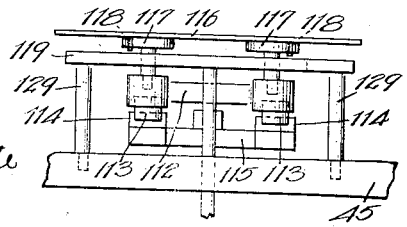
Fig. 15 is a side view of the same.

The scales are radially arranged on the table 45 and are alike in construction. Each scale beam 49 is provided on the under side with a notched block 99 resting upon a knife edge 100 on the table. The weight 101 is provided on the under side with notched blocks 102 resting on a knife edge 103 extending across the forked end 104 of the beam. 105 is a vertical rod rigidly connected with the weight 101 extending through an opening 106 in the table and pivotally connected with a beam 107 which is pivoted at 108 to a stud 109 on the under side of the table (Fig. 12.) The other end of the beam 107 is pivoted at 110 to a rod 111 secured to the scale plate carrier 112. The latter is provided with notched blocks 113 (Fig. 15) adapted to bear upon the knife edge blocks 114 on the forked end 115 of scale beam 49. The scale plate 116, on which the carton is carried, rests, during the secondary filling and weighing operation, upon supports 117 on the scale plate carrier 112, the scale plate being provided with guiding studs 118 extending slidably through openings in the supports 117.

In order to accurately hold the scale plate at the level with the carton track 63 when the carton is pushed upon the plate by the forwarding wheels 64, 64ª (Fig. 10), and discharged therefrom when filled, and in order that the bearings of the scale beam should not be injured by the discharge of material into the carton during the primary filling operation the machine is provided with a lifting device which lifts the scale plate from the scale plate carrier and holds it out of contact therewith for that portion of the revolution of the machine during which the carton is moved upon the scale plate and filled with the primary charge. 119 is a plate carried on a pair of rods 120 connected at their lower ends by a cross piece 121 provided on its under side with a clevis 122 in which is arranged a roller 123 turning on a shaft 124 mounted in bosses 125 formed on the clevis. The roller 123 is adapted to bear upon a cam 126 (Fig. 16) which is secured to the lower spider 37 of the machine. The high portion 127 of the cam is so positioned that the roller will meet it before the scale reaches the position, in the revolution of the machine, at which the filled carton is discharged from the machine, as will be hereinafter described. While the roller is traveling over this part of the cam the plate 119 lifts the scale plate from supports 117. The plate 119 is formed with apertures 128 through which supports 117 project. When the roller 123 rides down from the high portion of the cam, plate 119 comes to rest on studs 129 on the table 45.

Preferably the machine is furnished with positive means for lowering the scale pan lifting device. To this end a pair of rollers 130 are provided on the ends of shaft 124, the rollers being held in position by pins 131. These rollers engage cams 132, 133 (Figs. 17 and 18) secured to the lower spider 37 in position to engage rollers 130 at the time that roller 123 leaves the high portion 127 of cam 126.

*The primary filling means,* (Figs. 1, 2, 3, 4, 7 to 11.)

The upper table 46 is formed with a plurality of openings 134 with which the charging pockets 51 are alined. The charging pockets are closed at the bottom by a pair of hinged valves or closures 135, each valve being secured to a pintle 136 revolubly mounted in a pair of ears 137 on the under side of the pocket. One of the pintles has rigidly secured thereto a gear wheel 138 and the other a sector gear 139 meshed with gear 138. The valves are opened and closed by a slide 140, the outer end of which extends through a guide 141 secured to the charging pocket, the slide being formed on its under side with a rack 142 held in mesh with gear wheel 138 by a roller 143 on the pocket. As each opening 134 in the upper table comes under the lump starch hopper 52 the charging pocket alined with said opening is filled with starch, the valves at this time being closed. The amount of the charge is varied by adjusting an angle plate 144 on the hopper. The hopper does not extend quite down to table 46 so that the charging pockets will receive a heaping charge slightly variable in accordance with the position of plate 104.

Immediately after the empty carton has been put in position on the scale plate the valves 135 are opened and the charge is dumped into the carton, the opening of the valves being brought about by the following mechanism: 145 is a vertical shaft mounted in brackets 146 on cross pieces 147 secured to the two forward uprights 38 forming part of the stationary framework of the machine. Rigidly connected with shaft 145 is a finger 148 which is adapted to stand in the path of a bell crank 149 pivoted to a flange 150 at the bottom of the charging pocket 51. The other end of the bell crank bears against a roller 151 on the outer end of slide 140. The shaft 145 is provided with an arm 152 connected by a spiral spring 153 to one of the cross pieces 147. The bell crank 149 is rocked by engaging finger 148 which imparts an outward movement to slide 140 that opens the charging pocket valves. Continued rotation of the machine causes the bell crank to ride past finger 146, spring 153 being expanded to allow finger 146 to yield.

In order that the charging pocket valves should be opened only when there is a carton in place to receive the charge, the following device is provided for preventing the engagement between bell crank 149 and finger 146, which device is operated only in the absence of a carton: The shaft 145 is provided with a collar 154 to which is secured an angular arm 155 provided with a plate 156. The arm 155 is provided with a downwardly extending stud 157 (Fig. 10) which is adapted to bear successively against a plurality of cams 158 on the upper forwarding wheel 64. The carton is forced against the plate 156 when it is pushed upon the scale plate by the forwarding wheel (Fig. 7). Shortly after this the stud 157 meets one of the cams 158 and causes the plate 156 to be moved out of the path of the carton, shaft 145 turning in its bearings against the tension of spring 153 (Fig. 8). When the forwarding wheel is rotated to the position shown in Fig. 9 the stud 157, which is now in the position indicated by dotted lines and designated 157' (Fig. 9), rides off the cam 158 and the arm 155 is returned by spring 153 to its normal position (Fig. 7) with plate 156 against the next carton which is now in position on the next succeeding scale plate. If no carton be fed into the machine so that the rotation of shaft 145 is not stopped by plate 156 the rotation of the shaft, under the tension of the spring, will carry the finger 146 to a point which will allow the bell crank to pass said finger without coming in contact therewith. Consequently the charging pocket valves are not opened. Finger 159 on shaft 145 is adapted to come in contact with the upper end of shaft 65 so as to provide a maximum limit to the movement of the arm 155.

Preferably a vibrating agitating blade 160 is arranged in the charging pocket, this blade being fixed to a shaft 161 arranged in a boss 162 on the front of the charging pocket (Figs. 10 and 11). Shaft 161 is provided with a finger 162 adapted to engage angular abutments 163, 164 on the upper cross piece 147, movement of the blade in the other direction being brought about by a finger 165 pivoted to flange 166 on the upper table 46 and connected with the finger 162 by a link 167.

Figure 2:
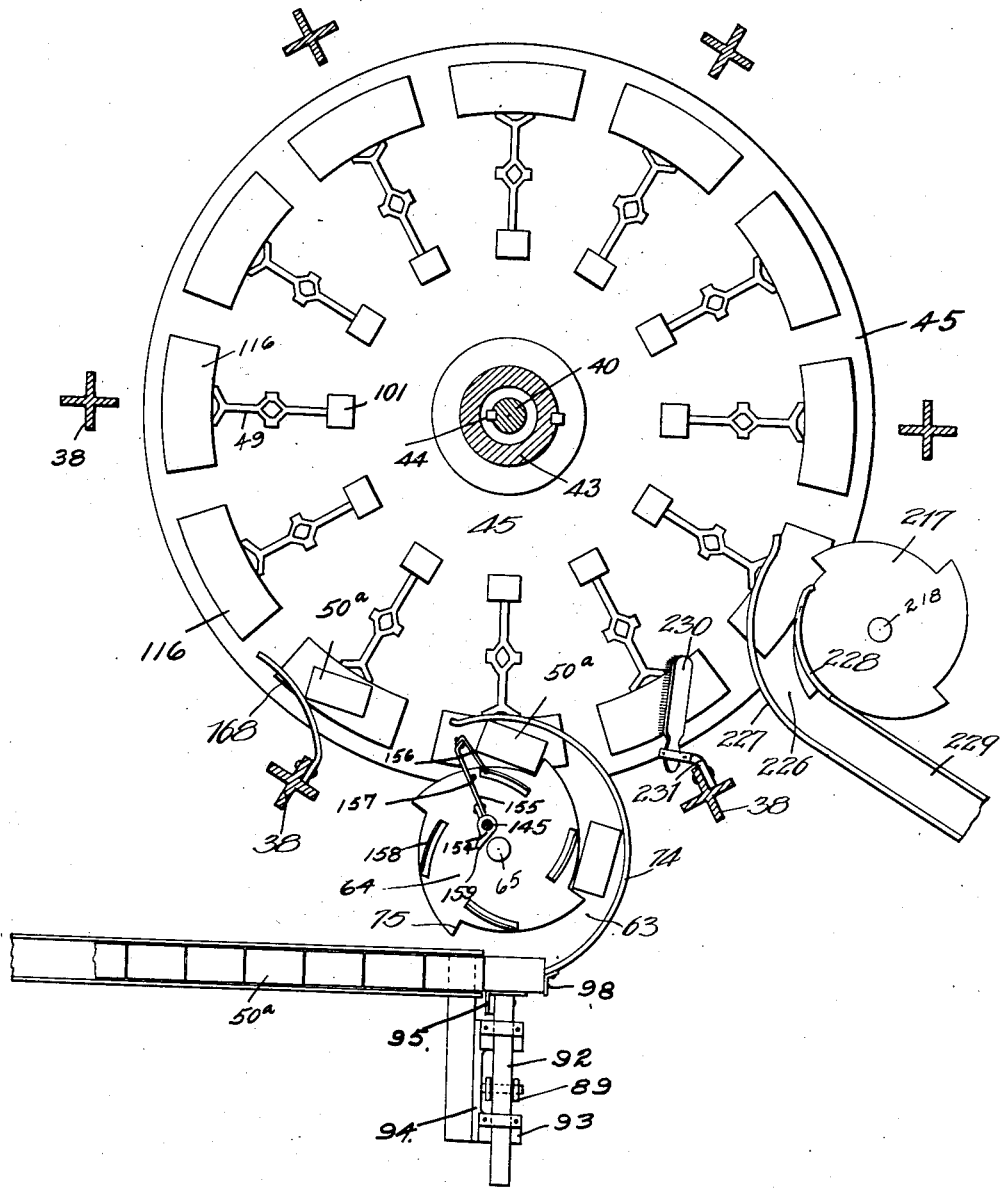
Fig. 2 is a sectional plan view just above the level of the scales.

In case the carton should be a trifle out of place on the scale plate when it leaves the forwarding wheel, it is straightened by an arm 168 on one of the forward stationary uprights 38 (Fig. 2). On this same upright, but at a higher level, is arranged a scraper 169 which bears on the table 46 and sweeps any starch that there may be on the table into the charging pockets. This occurs before the secondary filling begins so that it does not affect the accuracy of that operation.

*The secondary filling and weighing operations*, (Figs. 3, 4, 7 to 15, and 19 to 24.)

After the primary charge has been dumped into a carton the scale plate raising device, heretofore described, is lowered so as to bring the carton into operative relation with the scale (Fig. 4). About this time the charging pocket valves 135 are partially closed—simply for the purpose of making their closing movement shorter and more rapid—by the roller 151 on slide 140 coming into contact with a cam 170 on one of the forward uprights 37, this position of roller 151 being indicated by dotted lines in Fig. 8 and designated 151'.

The outer wall of the fine starch bin 54 is formed with a plurality of openings 171 adjacent the several openings opposite the opening 134 in the upper table 46, which lead to the charging pockets 51. Arranged in line with these openings are the screw conveyers 55, there being one such conveyer for each charging pocket, although in some of the figures of the drawings certain of these conveyers have been omitted for the sake of simplification. The conveyer, in each case, is arranged on a shaft 172 supported at one end by bracket 173 secured to the outer wall of the fine starch bin 54, the other end of the shaft extending through the inner wall of the bin and being provided with a bevel pinion 174 meshing with a bevel pinion 175 on a shaft 176 supported by a bracket 177 on the fine starch bin. The shaft 176 has rigid therewith a clutch member 178 (Fig. 21) formed with recesses 179 in which are arranged coupling studs 180 and springs 181 which bear against the studs. The studs are adapted to engage recesses 182 in a coupling member 183 slidably arranged on a splined shaft, 184 supported by a bearing 185 from the fine starch bin, the upper end of the shaft carrying a gear wheel 186 adapted to mesh with a rack 187 (Fig. 3) on the upper spider 39 of the machine. In order to facilitate the engagement of gear 186 with rack 187 the latter is provided with a hinged section 188, with which the gear first comes into contact, the hinged section being normally held in proper position by a spring 189.

The fine starch is fed from the bin 54 by the conveyer 55 and passes into the carton through the charging pocket 51, the valves 135 of which are preferably partially closed as shown at the left hand side of Fig. 4. As soon as enough material has been introduced into the carton to balance the scale 49 the rack slide 140 is moved inwardly so as to close valves 135 by means of a suction motor and connections as follows: The motor consists of a cylinder 190 and piston 191 (Fig. 24), the latter being connected by rod 192 with the slide 140. The head 193 of the cylinder has connected thereto a pipe 194 which connects with a pipe 195, the lower end of which is open and the upper end of which extends into a hub 196 (Figs. 19 and 20) and communicates with one of the transverse ducts 197 formed in said hub. The hub 196 is rigidly connected with the main shaft 40 of the machine and fits into a stationary ring 198 secured to the under side of the upper spider 39. The ring 198 is formed with an interior arcuate recess 199 with which a certain number of the ports 197 always communicate. Pipe 200 leads from the recess 199 to an air exhauster (not shown). The rod 192 is provided with a pin 201 adapted to engage a bell crank 202 pivoted to a bracket 203 on the under side of table 46. Connected to the other end of the bell crank is a clutch shifting arm 204 the forked end 205 of which is adapted to engage a recess 206 in the clutch member 183.

The scale beam 49 carries an arm 207, to the end of which is loosely connected a valve 208, the valve being formed with tabs 209 which are bent around the end of arm 207 and connected thereto by a wire 210. The valve is adapted to close the open lower end of pipe 195. The loose connection between the valve and the arm allows the valve to seat accurately and also permits the suction in pipe 95 to draw the valve against the pipe so that the suction motor operates quickly when the scale comes to a counterbalancing position. The closure of the lower end of pipe 195 by valve 208 causes the suction in pipe 195 to exhaust the air from cylinder 190, drawing the piston 191 to the inner end of the cylinder. At the same time the clutch member 193 is raised, disconnecting the screw conveyer 55 from its driving pinion 186. This stopping of the fine starch feed at the time the valves 135 are closed is optional. The purpose is to prevent the fine starch from being fed into the bottom of the cartons, that is, to prevent fine starch from forming part of the primary charge. On the other hand, by permitting the feed of the fine starch to continue for a certain definite period, regardless of whether the feed to the cartons is shut off or not, which would occur if the clutch connection were not used, a fixed proportion is maintained between lump starch and fine starch which might be a convenience from the point of view of supply to the machine.

Figure 3:
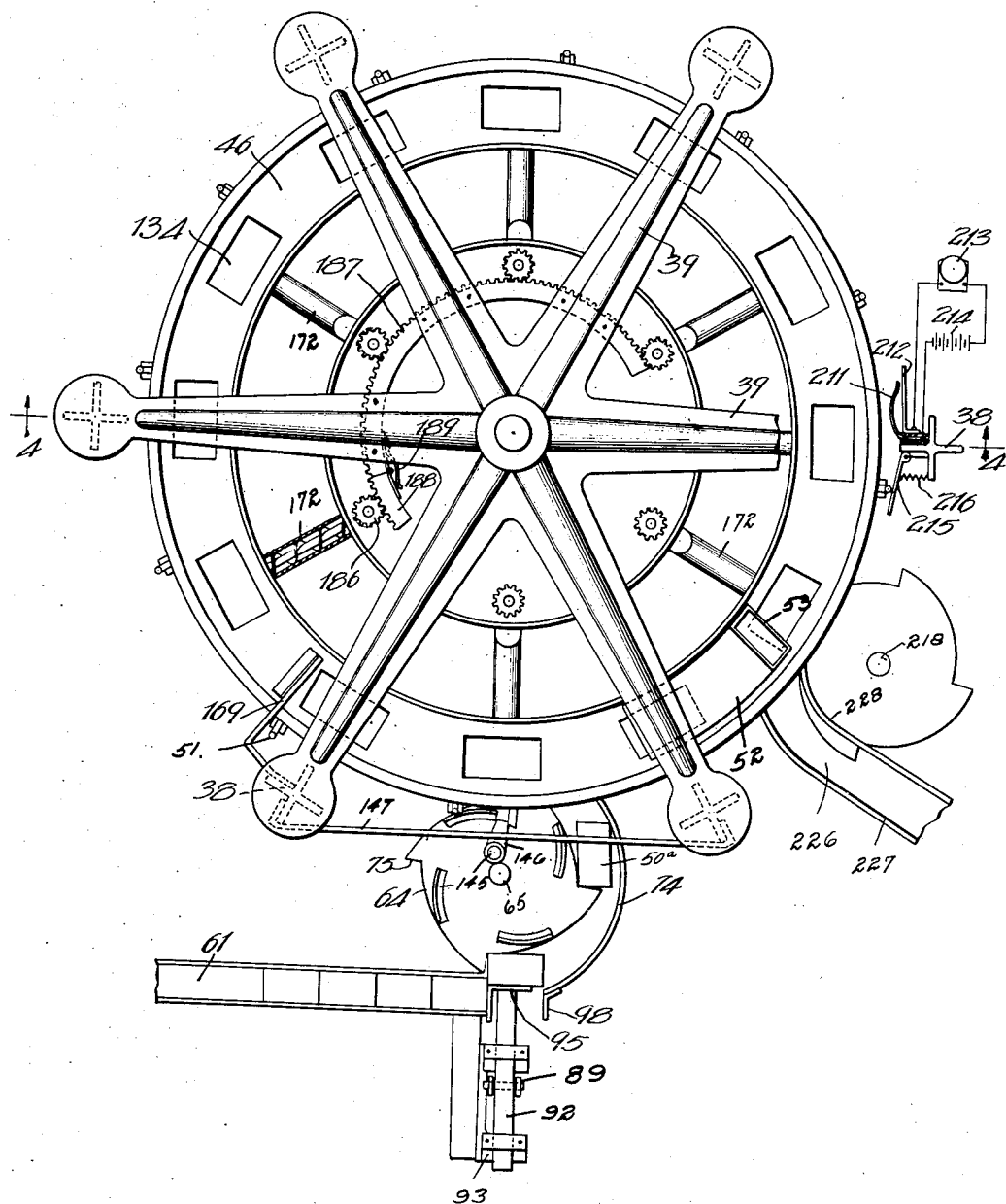
Fig. 3 is a top plan view.

*Warning signal and shut-off*, (Fig. 3.)

In case a scale has not been balanced by the time the carton is about to reach the point at which it is discharged from the machine, a warning signal is given so that the attendant can remove the particular carton and fill it to the required weight. Immediately thereafter the valves 135 of the charging pocket are closed by positive means.

Secured to the stationary upright 38 at the right hand side of the machine (Fig. 3) are a pair of spring contacts 211, 212, arranged in circuit with a bell 213 and battery 214. If the slide 140 has not been retracted by the vacuum motor by the time it reaches this point in its movement of rotation roller 151 will strike against contact 211, forcing it against contact 212 and closing the bell circuit. Thereafter the roller abuts against an inclined arm 215 pivoted to the same upright 38 and held in place by a spring 216 which is stiff enough not to yield appreciably. The slide 140 is forced inwardly and brings about the closing of valves 135 so that the feed through the charging pocket is stopped.

*Discharge of the cartons*, (Figs. 1, 2, 3 and 23.)

The filled cartons are removed from the scale plates (the scale plates at this time being supported by the lifting device 119, 120) by a pair of notched wheels 217 on a shaft 218 which turns in a bearing 219 on the base 35 of the machine and in a bearing provided by a bracket 220 on the lower spider 37. Shaft 218 is provided with a bevel gear 222 on a shaft 223 mounted in bearings 224 on the base 35, the other end of the shaft provided with a bevel gear 225 which is in mesh with the bevel gear 59 on the central shaft 40. The discharge wheels 217 push the cartons upon a track 226 provided with retaining rails 227, 228, which project over the scale plates. From track 227 the cartons pass upon a belt conveyer 229.

Preferably a brush 230, supported on a bracket 231 attached to one of the forward stationary uprights 38, is arranged so that it sweeps the scale plates, removing any split starch which, if allowed to remain, would affect the accuracy of the weighing operations. The fine starch is delivered to the bin 54 through valve pipe 232 (Fig. 1).

*Summary of operation.*

The empty cartons are placed on the scale plates 116 by the forwarding wheels 64 being fed to the forwarding wheel by the follower 95. To follow the operations of a single filling unit—the valves 135 of the charging pocket are opened when the bell crank 149 abuts the finger 146 and is rocked against roller 151 to impart an outward movement to the slide rack 140. The roller 151 then comes into contact with cam 117 and the valves 135 are partially closed. As soon as gear wheel 186 engages with rack 188, 187, the fine starch from bin 54 is fed by conveyer 55 into the carton through the partially opened valves of the charging pocket. This continues until the scale balances, whereupon valve 208 on arm 207 on the scale beam 209 closes the open end of pipe 195 through which air is being drawn by the exhausting apparatus (not shown) connected with pipe 200. When the end of pipe 195 is closed the suction operates on piston 191 of the suction motor 190 and draws the slide rack inwardly closing the valves 135. If the fine starch feeding mechanism has the clutch arrangement shown and described the closing of valves 135 is accompanied by the disconnection of the worm conveyer 55 from its driving pinion 186 stopping the feed of the fine starch. The carton completes the rest of its circular movement and is picked up by the discharging wheels 217 and pushed upon the belt conveyer 229 through track 226. If the scale has not balanced by the time it comes to a point opposite contacts 211, 212, roller 151 closes the bell circuit in which these contacts are located and a warning signal is given to the operator who may remove the carton from the machine and put in enough starch by hand to bring it to weight. In case the valves 135 of the charging pocket are not closed by the suction motor roller 151 will come against the cam 215, causing the valves to close.

*Modified construction shown in Figs. 25 to 31 inclusive.*

In the drawings illustrating the modification, 40ª designates a vertical shaft which may be supported in substantially the same manner as shaft 40 previously described. A lower table 45ª is keyed or otherwise secured to the shaft 40ª so as to rotate therewith. For the purpose of reducing the weight of the apparatus and to also prevent the starch lumps or dust from collecting on the lower table in a manner to interfere with the proper operation of the apparatus, the central portion of the table 45ª is provided with open spaces 45ᵇ between radially extending arms 45ᶜ. In this construction the scales are radially disposed on the flat margin 45ᵈ of the rotating table and consist, in each case, of the beam 49ª which is of substantially an inverted V-shape in cross section and is provided with a knife edge 49ᵇ which rests on V-shaped pivot blocks 49ᶜ, 49ᶜ on a post 49ᵈ. The inner end of the beam is threaded and carries the weight 101ª which may be locked in any adjusted position by means of the lock nut 101ᵇ. 49ᵈ designates a valve carried at the inner end of the scale beam and consists of a piece of flat metal, preferably a tin disk carried by the finger 49ᵉ, fitted into a slit in the end of the scale beam. The disk 49ᵈ is provided with a suitable stem on its under side which projects loosely through a central aperture in the member 49ᶜ. The outer end of the beam 49ª is substantially the same in construction as is described in connection with Figs. 1 to 24 inclusive and carries a scale plate 116ª. The scale plate is held in vertical position by means of the vertical rod 111ª, the lower end of which is pivoted at 110ª to a pivoted link 107ª. The scale plate 116ª is lifted to its carton receiving position by means of the four rods designated 120ª which operate vertically in bearings 120ᵇ formed on the upper surface of a housing 120ᶜ. The rods 120ª are fixed in apertures formed in the lifting plate 119ª and are operated by means of a bell crank member 121ª which is pivoted at 121ᵇ to the vertical walls of the housing and connected with lifting plate 119ª by means of links 121ᶜ. The free end of the bell crank is provided with a roller 121ᵈ which operates against the vertical face of the cam track 126ª, which may be suitably supported, for example, on the spider 37.

As the table 45ª rotates, the roller 121ᵈ rides upon an inwardly projecting portion 126ᵇ of the cam ring so as to rock the bell crank in a manner to bring the upper ends of the rods 120ª into contact with the under surface of the scale plate 116ª so as to lift the same to its carton receiving or discharging position.

We claim:

1. In a machine for filling receptacles, the combination of a revoluble structure on which the receptacles are carried during the filling operation, a guideway for the empty receptacles, a forwarding wheel provided with projections adapted to move the receptacles upon said revoluble structure, and means actuated with said forwarding wheel for moving said receptacles in succession from the guideway into position to be engaged by the forwarding wheel.

2. In a machine for filling receptacles, the combination of a revoluble structure on which the receptacles are carried during the filling operation, a guideway for the empty receptacles, a forwarding wheel provided with projections adapted to move the receptacles upon said revoluble structure, and a reciprocating follower actuated with said forwarding wheel for moving said receptacles in succession from the guideway into position to be engaged by said forwarding wheel.

3. In a machine for filling receptacles, the combination of a revoluble structure on which the receptacles are carried during the filling operation, a guideway for the empty receptacles, a forwarding wheel provided with projections adapted to move the receptacles upon said revoluble structure, a reciprocating follower to move the receptacles in succession from the guideway into position to be engaged by said forwarding wheel, a shaft to which the forwarding wheel is secured, a cam on said shaft, a slide actuated by said cam, and a spring returned lever connecting the slide with said follower.

4. In a machine for filling receptacles, the combination of a scale, a scale plate adapted to receive an empty receptacle, means for depositing a charge of material into the receptacle while the receptacle is on said plate, and means for holding said scale plate out of operative relation with the scale while the charge is being deposited in the receptacle.

5. In a machine for filling receptacles, the combination of a revoluble structure on which the receptacles are carried during the filling operation, a scale, a scale plate adapted to receive an empty receptacle, means for depositing a charge of material into the receptacle while the receptacle is on said plate, and means actuated by the movement of the revoluble structure for holding said scale plate out of operative relation with the scale while the charge is being deposited in the receptacle.

6. In a machine for filling receptacles, the combination of a revoluble structure on which the receptacles are carried during the filling operation, a scale, a scale plate adapted to receive an empty receptacle, means for depositing a charge of material into the receptacle while the receptacle is on said plate, and cam-operated means for holding said scale plate out of operative relation with said scale while the charge is being deposited in the receptacle.

7. In a machine for filling receptacles, the combination of a revoluble structure on which the receptacles are carried during the filling operation, a scale, a scale plate to receive an empty receptacle, means for depositing a charge of material into said receptacle, a reciprocating element for lifting said plate from the scale before the charge is deposited, and a cam to raise the lifting element to operative position before and hold it there during the deposit of the charge in the receptacle.

8. In a machine for filling receptacles, the combination of a revoluble structure on which the receptacles are carried during the filling operation, a scale, a scale plate to receive an empty receptacle, means for depositing a charge of material into said receptacle, a reciprocating element for lifting said plate from the scale before the charge is deposited, a cam to raise the lifting element to operative position before and hold it there during the deposit of the charge, and means for positively forcing said lifting element into inoperative position.

9. In a machine for filling receptacles, the combination of a revoluble structure on which the receptacles are carried during the filling operation, a scale, a scale plate, a track over which the receptacles are adapted to be pushed to the scale plate, and means for raising the scale plate from said scale to the level of the track and holding it there while the receptacle is being pushed upon the scale plate.

10. In a machine for filling receptacles, the combination of a revoluble structure on which the receptacles are carried during the filling operation, a scale, a scale plate, a track over which the receptacles are adapted to be pushed to the scale plate, means for depositing a charge of material into a receptacle while on said plate, and means for raising said plate from the scale to the level of the track and holding it out of contact with the scale during the movement of the receptacle upon the plate and the deposit of the charge therein.

11. In a machine for filling receptacles, the combination of a revoluble structure on which the receptacles are carried during the filling operation, a scale, a scale plate, a track over which the receptacles are adapted to be pushed to the scale plate, means for depositing a charge of material into a receptacle while on said plate, a lifting element provided with a roller for raising said plate from the scale to the level of the track and holding it out of contact with the scale during the movement of the receptacle upon the plate and the deposit of the charge therein, and a cam ring on which said roller runs.

12. In a machine for filling receptacles, the combination of a revoluble structure on which the receptacles are carried during the filling operation, a scale, a scale plate, a track over which the receptacles are adapted to be pushed to the scale plate, means for depositing a charge of material into the receptacle while on said plate, a lifting element provided with a roller for raising said plate from the scale to the level of the track and holding it out of contact with the scale during the movement of the receptacle upon the scale plate and the deposit of the charge therein, a cam ring on which said roller runs which operates to raise the lifting element, and means for forcing the lifting element to a lower position.

13. In a machine for filling receptacles, the combination of a revoluble structure on which the receptacles are carried during the filling operation, means for introducing a charge of material into a receptacle, a scale comprising a beam and a scale plate, a lifting element for raising the plate from the beam during a part of the filling operation, and cam mechanism for controlling the movements of said lifting element.

14. In a filling machine, the combination of a scale adapted to support a receptacle; mechanism for feeding material into said receptacle; a suction motor, for shutting off the feed of said material, having a normally open air intake; a valve support associated with said scale; and a valve loosely connected with said support so that it is automatically seated over said air intake by suction when it approaches said intake.

15. In a filling machine, the combination of a scale beam; a plate on one end to support a receptacle; a weight on the other end; a suction motor for shutting off the feeding of said material having a normally open air intake; an arm on the weighted end of said beam; and a disk valve which is loosely connected with said arm so that it is automatically seated over said air intake by suction when it approaches said intake.

16. In a filling machine, the combination of a charging pocket having a valve at the bottom of the same, means for positioning a receptacle under the charging pocket, and mechanism associated with said positioning means which is operative only when a receptacle is in position under the pocket for opening said valve.

17. In a filling machine, the combination of a stationary structure, a revoluble structure, a charging pocket on said revoluble structure having a valve at the bottom thereof, mechanism for opening said valve comprising a pair of pivoted members, one on said stationary structure and the other on the revoluble structure, which engage only when a receptacle is in position under the pocket.

18. In a filling machine, the combination of a stationary structure, a revoluble structure, a charging pocket on said revoluble structure having a valve at the bottom thereof, mechanism for opening said valve comprising a pair of pivoted members, one on the revoluble structure and one on the stationary structure, an element associated and movable with said last named member adapted to bear against a receptacle when in position under said charging pocket, means for moving said element in a direction away from the receptacle, and a spring to draw said element in the opposite direction which operates to move the rocking member associated therewith out of the path of the other rocking member when there is no receptacle for said element to bear against.

19. In a filling machine, the combination of a stationary structure; a revoluble structure; charging pockets on said revoluble structure having valves; a forwarding wheel for moving receptacles successively under said pockets; bell cranks on said revoluble structure and associated with said charging pockets, respectively, and mechanism operated thereby for opening said valves; a revoluble device on the stationary structure having a finger against which the bell cranks are thrust and provided with an arm adapted to bear successively against the receptacles under said pockets; a cam on the forwarding wheel which operates to move said arm away from the position occupied by said receptacles; and a spring which forces the arm against the receptacles, or if no receptacle is there, carries the finger on the revoluble device out of the path of the bell crank.

20. In a filling machine, the combination of a stationary structure; a revoluble structure provided with a plurality of scales and with charging pockets located above said scales, respectively; a forwarding wheel for moving receptacles successively upon said scales under said pockets, a shaft revolubly mounted on said stationary structure above said forwarding wheel provided with a finger and with an arm adapted to bear successively against the receptacles on said scales; a spring which operates to move said arm in the direction toward said receptacles; a valve for the lower end of each of said charging pockets; mechanism for opening said valve comprising a bell crank on the charging pocket which is adapted to stand in the path of the finger on said shaft; and a cam on said forwarding wheel adapted to engage the arm which bears against the receptacle and move it away from its position of engagement therewith against the tension of said spring and thereafter release said member, whereby, if there be no receptacle on the scale, the bell crank on the charging pocket will pass the finger on said shaft without engaging the same.

21. In a filling machine, the combination of supporting means for a receptacle, a charging pocket under which the receptacle is placed having a hinged valve at the bottom provided with a pinion, a rack meshing with said pinion, and mechanism for moving said rack in opposite directions for operating said valve.

22. In a filling machine, the combination of supporting means for a receptacle, a charging pocket under which the receptacle is placed having a pair of hinged bottom valves, intermeshing pinions on said valves, a rack in mesh with one of said pinions, and mechanism for moving said rack in opposite directions to operate said valves.

23. In a filling machine, the combination of a charging pocket having a valve at the bottom under which a receptacle is adapted to be placed, means for opening said valve to deposit a charge of material into the receptacle, means for partially closing the same, means for feeding additional material through said pocket while the valve is partially closed, and means for completely closing the valve.

24. In a filling machine, the combination of a charging pocket having a valve at the bottom under which a receptacle is adapted to be placed, means for opening said valve to deposit a charge of material into the receptacle, means for partially closing the same, means for feeding additional material through said pocket while the valve is partially closed, and a suction-operated motor for completely closing said valve.

25. In a filling machine, the combination of a charging pocket having a valve at the bottom under which a receptacle is adapted to be placed, means for opening said valve to deposit a charge of material into the receptacle, means for partially closing the same, means for feeding additional material through said pocket while the valve is partially closed, a scale which supports the receptacle during the filling operation, and means actuated by the balancing of said scale for completely closing said valve.

26. In a filling machine, the combination of a charging pocket having a valve at the bottom under which a receptacle is adapted to be placed, means for opening said valve to deposit a charge of material into the receptacle, means for partially closing the valve, means for feeding additional material through said pocket while the valve is partially closed, a scale which supports the receptacle during the filling operation, and a suction-operated motor actuated by the balancing of the scale for closing said valve.

27. In a machine for filling receptacles, the combination of a revoluble structure, a scale having a scale plate on which the receptacle is supported during the filling operation, a discharge track, mechanism for moving the filled receptacle from the scale plate thereto, and means operated independently of the balancing action of said scales for holding the scale plate at the level of said discharge track during the operation of discharging the filled receptacle.

28. In a machine for filling receptacles, the combination of a revoluble structure, a scale thereon having a scale plate on which the receptacle is supported during the filling operation, a track and mechanism associated therewith for feeding the empty receptacles upon the scale plate, and means operated independently of the balancing action of said scales for holding the scale plate at the level with said track during said feeding operation.

29. In a machine for filling receptacles, the combination of a revoluble structure, a scale thereon having a scale plate on which the receptacle is supported during the filling operation, a track and mechanism associated therewith for feeding the empty receptacles upon the scale plate, a track and mechanism associated therewith for removing the filled receptacles from the scale plate, and means operated independently of the balancing action of said scales for holding said scale plate at the level of said tracks during the feeding of the empty receptacles and the removal of the filled receptacles from said machine.

30. In a machine for filling receptacles, the combination with a revoluble structure provided with a charging pocket adapted to be opened so as to discharge its contents, a scale arranged under said charging pocket, a scale plate loosely connected with said scale, tracks and mechanism associated therewith for feeding empty receptacles on the scale plate and discharging them therefrom when filled, and means which operates to raise the scale plate from the scale while a filled receptacle is being discharged from the scale plate and while an empty receptacle is being moved upon the scale plate and receives the charge from said charging pocket.

31. In a machine for filling receptacles, the combination with a revoluble structure provided with a charging pocket adapted to be opened so as to discharge its contents, a scale arranged under said charging pocket, a scale plate loosely connected with said scale, tracks and mechanism associated therewith for feeding empty receptacles on the scale plate and discharging them therefrom when filled, and means which operates to raise the scale plate from the scale while a filled receptacle is being discharged from the scale plate and while an empty receptacle is being moved upon the scale plate and receives the charge from said charging pocket, said means adapted to hold said scale plate at a level with said tracks during the aforesaid operations.

32. In a machine for filling receptacles, the combination of a revoluble structure, a scale thereon, a scale plate to support the receptacles during the filling operations, means for feeding empty receptacles on said scale plate, means for discharging the filled receptacles therefrom, means for depositing charges of material into said receptacles, and means for lifting the scale plate from said scale during the aforesaid operations.

33. In a machine for filling receptacles, the combination of a revoluble structure, a scale thereon, a scale plate to support the receptacles during the filling operations, means for feeding empty receptacles on said scale plate, means for discharging the filled receptacles therefrom, means for depositing charges of material into said receptacles, and means for lifting the scale plate from said scale during the aforesaid operations, comprising a stationary cam ring with which said lifting means engages during the rotary movement of said revoluble structure.

34. In a filling machine for receptacles, the combination of a revoluble structure on which the receptacles are carried during the filling operation, means for introducing a charge of material into a receptacle, a scale provided with a scale plate, a lifting element for raising the plate from the scale during each movement of rotation of the revoluble structure, and cam mechanism for controlling the movements of said lifting element.

35. In a filling machine, the combination of a stationary structure, a revoluble structure having a charging pocket provided with a valve, supporting means under said pocket for a receptacle, mechanism for opening said valve having a projecting member whereby said mechanism is actuated, a revoluble device on said stationary structure having an arm to bear against the receptacles when placed under said charging pocket and a finger with which said actuating projection is adapted to contact, a spring to turn the revoluble device in the direction to bring said arm in contact with the receptacle, and means for turning said revoluble device in the opposite direction whereby said arm will bear against a receptacle, if there be one under the charging pocket, and place said finger in the path of said actuating projection, or if there be no receptacle in place under the charging pocket whereby said spring will move said finger out of the path of said actuating projection.

36. In a filling machine, the combination of a charging pocket having a valve at the bottom, means for feeding a receptacle into material receiving position under said valve, means for opening said valve to deposit a charge of material into the receptacle, means for thereafter feeding additional material through said empty pocket, and means for closing said valve.

37. In a filling machine, the combination of a charging pocket having a valve at the bottom, means for feeding a receptacle into material receiving position under said valve, means for opening said valve to deposit a charge of material into the receptacle, a scale which supports the receptacle during the filling operation, and means actuated by the balancing of the scale for closing said valve.

38. In a filling machine, the combination of a charging pocket having a valve at the bottom under which a receptacle is adapted to be placed, means for opening said valve to deposit a charge of material into the receptacle, a scale which supports the receptacle during the filling operation, and a suction-operated motor actuated by the balancing of the scale for closing said valve.

39. In a filling machine, the combination of a revoluble structure provided with a charging pocket open at the top and provided with a valve at the bottom, a stationary hopper arranged above the charging pocket from which it receives its charge, a scale on the revoluble structure below the charging pocket adapted to support a receptacle, mechanism for opening said valve so that the charge therein is deposited into the receptacle, means for feeding material into the receptacle through said empty pocket, and mechanism actuated by the balancing of said scale for stopping said feeding operation.

40. In a filling machine, the combination of a revoluble structure provided with a charging pocket open at the top and provided with a valve at the bottom, a stationary hopper arranged above the charging pocket from which it receives its charge, a scale on the revoluble structure below the charging pocket adapted to support a receptacle, mechanism for opening said valve so that the charge therein is deposited in the receptacle, means for feeding material into the receptacle through said empty pocket, and mechanism actuated by the balancing of said scale for closing said valve.

41. In a filling machine, the combination of a revoluble structure provided with a charging pocket open at the top and provided with a valve at the bottom, a stationary hopper arranged above the charging pocket from which it receives its charge, a scale on the revoluble structure below the charging pocket adapted to support a receptacle, mechanism for opening said valve so that the charge therein is deposited in the receptacle, means for feeding material into the receptacle through said empty pocket, mechanism actuated by the balancing of said scale for closing said valve, and means for closing the valve in case the scale has not balanced when a predetermined position in the movement of rotation of the revoluble structure has been reached.

42. In a filling machine, the combination of a revoluble structure provided with a charging pocket open at the top and having a valve at the bottom, a stationary hopper arranged above the charging pocket from which it receives its charge, a scale on the revoluble structure below the charging pocket adapted to support a receptacle, mechanism for opening said valve so that the charge therein is deposited in the receptacle, means for feeding material through the charging pocket after it has deposited its charge, and mechanism actuated by the balancing of said scale for stopping said feed and closing the charging pocket valve.

43. In a filling machine, the combination of a revoluble structure provided with a charging pocket open at the top and having a valve at the bottom, a stationary hopper arranged above the charging pocket from which it receives its charge, a scale on the revoluble structure below the charging pocket adapted to support a receptacle, mechanism for opening said valve so that the charge therein is deposited in the receptacle, means for partially closing said valve, means for feeding additional material into the receptacle through said charging pocket, and means actuated by the balancing of said scale for closing said valve.

44. In a filling machine, the combination of a revoluble structure provided with a charging pocket open at the top and having a valve at the bottom, a stationary hopper arranged above the charging pocket from which it receives its charge, a scale on the revoluble structure below the charging pocket adapted to support a receptacle, mechanism actuated only when the receptacle is in position on the scale for opening said valve so that the charge therein is deposited into the receptacle, means for feeding additional material into the receptacle through said charging pocket, and means actuated by the balancing of said scale for stopping the feed of material into the receptacle.

45. In a filling machine, the combination of a revoluble structure provided with a charging pocket having a valve at the bottom, means for filling said pocket with material, a scale arranged under said pocket and adapted to support a receptacle, mechanism for opening said valve so that the charge of material in the pocket is deposited in the receptacle, means for feeding additional material into said receptacle through the empty charging pocket, and mechanism actuated by the balancing of said scale for stopping the feed of material into the receptacle.

46. In a filling machine, the combination of a revoluble structure provided with a charging pocket having a valve at the bottom, means for filling said pocket with material, a scale arranged under said pocket and adapted to support a receptacle, mechanism for opening said valve so that the charge of material in the pocket is deposited in the receptacle, a vessel on said revoluble structure containing a supply of material and provided with means for feeding the same through the empty charging pocket, mechanism for setting said feeding means in operation, and mechanism actuated by the balancing of said scale for stopping the feed of material into the receptacle.

47. In a filling machine, the combination of a revoluble structure provided with a charging pocket having a valve at the bottom, means for filling said pocket which is adjustable so as to vary the charge introduced thereinto, a scale arranged under said pocket and adapted to support a receptacle, mechanism for opening said valve so that the charge of material in the pocket is deposited in the receptacle, means for feeding additional material into said receptacle through the empty charging pocket, and mechanism actuated by the balancing of said scale for stopping the feed of material into the receptacle.

48. In a filling machine, the combination of a revoluble structure provided with a charging pocket having a valve at the bottom, means for filling said pocket with material, a scale arranged under said pocket and adapted to support a receptacle, mechanism actuated only when a receptacle is in position under said pocket for opening said valve so that the charge of material in the pocket is deposited in the receptacle, means for feeding additional material into said receptacle through the empty charging pocket, and mechanism actuated by the balancing of said scale for stopping the feed of material into the receptacle.

49. In a filling machine, the combination of a revoluble structure provided with a charging pocket having a valve at the bottom, means for filling said pocket with material, a scale arranged under said pocket and adapted to support a receptacle, mechanism for opening said valve so that the charge of material in the pocket is deposited in the receptacle, means for feeding additional material into said receptacle, mechanism actuated by the balancing of said scale for closing said valve, and means operated at a given point in the revolution of said revoluble structure for closing said valve even if the scale has not come into balance by that time.

50. In a filling machine, the combination of a revoluble structure, a scale thereon adapted to support a receptacle, means for feeding material into said receptacle the operation of which is stopped by the balancing of said scale, and means operated at a given point in the revolution of said revoluble structure for stopping said feeding operation even if the scale has not come to a balance.

51. In a filling machine, the combination of a revoluble structure, a scale thereon adapted to support a receptacle, means for feeding material into said receptacle the operation of which is stopped by the balancing of said scale, means operated at a given point in the revolution of said revoluble structure for stopping said feeding operation even if the scale has not come to a balance, and means operated thereafter for discharging the receptacle from said machine.

52. In a filling machine, the combination of a revoluble structure provided with a charging pocket open at the top and having a valve at the bottom, a hopper containing a supply of material arranged above said charging pocket with which the charging pocket comes into register at a point in the revolution of said revoluble structure, and a vertically adjustable element on said hopper which can be moved to a point more or less remote from the upper end of the charging pocket so as to vary the amount of the charge delivered thereto.

53. In a filling machine, the combination of a circular revoluble table formed with a plurality of circumferentially arranged openings, charging pockets arranged under said table in line with said openings, and a stationary filling hopper arranged above the table so that the charging pockets are successively filled in passing thereunder, said hopper being provided with a vertically adjustable member to vary the amount of the charges received by said pockets.

54. In a filling machine, the combination of a revoluble structure comprising a circular table, said table being formed with a plurality of circumferentially arranged openings, charging pockets arranged under said table in line with said openings and provided with discharge valves, scales on said structure below the charging pockets, means for opening said valves so that the charges of material therein are deposited in said receptacles, a filling hopper arranged above said table with which the charging pockets come into register, means for feeding additional material into the receptacles, mechanism actuated by the balancing of the scales for stopping the operation of said feeding means, and a stationary scraper arranged so that it removes the material from said table and introduces the same into the receptacles through the charging pockets before the additional feeding of material commences.

55. In a filling machine, the combination of a revoluble structure provided with a charging pocket from which the material is delivered by gravity, a vibrating member in said pocket to prevent the clogging of the material therein, and means for operating said vibrating member.

56. In a filling machine, the combination of a revoluble structure provided with a charging pocket from which the material is delivered by gravity, a vibrating member arranged flatwise against the inner wall of said charging pocket to prevent the clogging of material therein, and means for operating said vibrating member.

57. In a filling machine, the combination of a revoluble structure provided with a charging pocket from which the material is delivered by gravity, a vibrating member arranged flatwise against the inner wall of said charging pocket to prevent clogging of material therein and provided with a finger arranged outside of said pocket, and stationary abutments against which said finger strikes so as to produce the vibration of said member.

58. In a machine for filling receptacles, the combination of a revoluble structure adapted to support a plurality of receptacles in circular arrangement, a supply vessel on said structure above the receptacles, feeding devices adapted to feed material into receptacles from said vessel, a stationary arcuate rack, and a gear wheel to mesh with said rack associated with each of said feeding devices to operate the same.

59. In a machine for filling receptacles, the combination of a revoluble structure adapted to support a plurality of receptacles in circular arrangement, a supply vessel on said structure above the receptacles, feeding devices adapted to feed material into the receptacles from said vessel, a stationary arcuate rack less than a complete circle, and a gear wheel to mesh with said rack associated with each of said feeding devices to operate the same.

60. In a machine for filling receptacles, the combination of a revoluble structure adapted to support a plurality of receptacles in circular arrangement, a supply vessel on said structure above the receptacles, feeding devices adapted to feed material into the receptacles from said vessel, a stationary arcuate rack less than a complete circle, and a gear wheel to mesh with said rack associated with each of said feeding devices to operate the same, said rack being provided at the end met by said gear wheel with a hinged, spring-pressed rack section.

61. In a machine for filling receptacles, the combination of a revoluble structure adapted to support a plurality of receptacles in circular arrangement, a supply vessel on said structure above the receptacles, feeding devices adapted to feed material into receptacles from said vessel, a stationary, arcuate rack, a gear wheel to mesh with said rack associated with each of said feeding devices to operate the same, and automatic clutches for operatively connecting and disconnecting said gear wheels with their respective feeding devices.

62. In a machine for filling receptacles, the combination of a revoluble structure, a a plurality of scales in circular arrangement on said structure adapted to support receptacles, a supply vessel on said structure above the receptacles, feeding devices adapted to feed the material into said receptacles from said vessel, an arcuate, stationary rack, gear wheels to mesh with said rack associated with said feeding devices to operate the same, and mechanism operated by the balancing of said scales for stopping the feed of material into said receptacles.

63. In a machine for filling receptacles, the combination of a revoluble structure, a plurality of scales in circular arrangement on said structure adapted to support receptacles, a supply vessel on said structure above the receptacles, feeding devices adapted to feed the material into said receptacles from said vessel, an arcuate, stationary rack, gear wheels to mesh with said rack associated with said feeding devices to operate the same, and clutches operatively connecting the gear wheels with their respective feeding devices comprising clutch members which are disconnected by the balancing of said scales.

64. In a machine for filling receptacles, the combination of a revoluble structure, a plurality of scales in circular arrangement on said structure adapted to support receptacles, a supply vessel on said structure above the receptacles, feeding devices adapted to feed the material into said receptacles from said vessel, an arcuate, stationary rack, gear wheels to mesh with said rack associated with said feeding devices to operate the same, valves which when closed intercept the material being fed from said vessel into the receptacles, and mechanism actuated by the balancing of the scales for closing said valves.

65. In a machine for filling receptacles, the combination of a revoluble structure, a plurality of scales in circular arrangement on said structure adapted to support receptacles, a supply vessel on said structure above the receptacles, feeding devices adapted to feed the material into said receptacles from said vessel, an arcuate, stationary rack, gear wheels to mesh with said rack associated with said feeding devices to operate the same, valves which when closed intercept the material being fed from said vessel into the receptacles, mechanism actuated by the balancing of the scales for closing said valves, and clutches for engaging the gear wheels with their respective feeding mechanisms comprising clutch members which are disengaged when the scales balance.

66. In a machine for filling receptacles, the combination of a revoluble structure adapted to support a plurality of receptacles in circular arrangement, an annular supply vessel on said structure, screw conveyers arranged in said vessel in position to feed material into the receptacles, a stationary arcuate rack arranged within said annular vessel, and mechanism for operating said screw conveyers comprising gear wheels meshing with said rack.

67. In a machine for filling receptacles, the combination of a revoluble structure adapted to support a plurality of receptacles in circular arrangement, an annular supply vessel on said structure, screw conveyers arranged in said vessel in position to feed material into the receptacles, a stationary arcuate rack arranged within said annular vessel, mechanism for operating said screw conveyers comprising gear wheels meshing with said rack, and automatic clutches for operatively connecting and for disconnecting the gear wheels and their respective screw conveyers.

68. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, a supply vessel on said revoluble structure. feeding devices operative after the receptacles have received the aforesaid charges for feeding material from the supply vessel into the receptacles through the pockets, and mechanism actuated by the balancing of said scales for stopping the feeding of the material into said receptacles.

69. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, a supply vessel on said revoluble structure, feeding devices operative after the receptacles have received the aforesaid charges for feeding material from the supply vessel into the receptacles, and mechanism actuated by the balancing of said scales for stopping the feeding of the material into said receptacles.

70. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, a supply vessel on said revoluble structure, feeding devices operative after the receptacles have received the aforesaid charges for feeding material from the supply vessel into the receptacles, mechanism actuated by the balancing of said scales for stopping the feeding of the material into said receptacles, and an alarm device actuated if a scale reaches a certain point in the revolution of the machine without balancing.

71. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, a supply vessel on said revoluble structure, feeding devices operative after the receptacles have received the aforesaid charges for feeding material from the supply vessel into the receptacles, mechanism actuated by the balancing of said scales for stopping the feeding of the material into said receptacles, an alarm device actuated if a scale reaches a certain point in the revolution of the machine without balancing, and means for thereafter stopping the feed of material into such receptacle.

72. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, a supply vessel on said revoluble structure, feeding devices operative after the receptacles have received the aforesaid charges for feeding material from the supply vessel into the receptacles through the pockets, and mechanism actuated by the balancing of said scales for closing said valves.

73. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, feeding devices operative after the receptacles have received the aforesaid charges for feeding material into the receptacles through the pockets, and mechanism actuated by the balancing of said scales for stopping the feeding of the material into said receptacles.

74. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, feeding devices operative after the receptacles have received the aforesaid charges for forcibly feeding material into the receptacles, and mechanism actuated by the balancing of said scales for stopping the feeding of the material into said receptacles.

75. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, feeding devices operative after the receptacles have received the aforesaid charges for feeding material into the receptacles, mechanism actuated by the balancing of said scales for stopping the feeding of the material into said receptacles, mechanism actuated by the balancing of said scales for stopping the feeding of the material into said receptacles, and an alarm device actuated if a scale reaches a certain point in the revolution of the machine without balancing.

76. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, feeding devices operative after the receptacles have received the aforesaid charges for feeding material into the receptacles, mechanism actuated by the balancing of said scales for stopping the feeding of the material into said receptacles, an alarm device actuated if a scale reaches a certain point in the revolution of the machine without balancing, and means for thereafter stopping the feed of material into such receptacle.

77. In a machine for filling receptacles, the combination of a revoluble structure provided with a plurality of charging pockets having valves at the bottoms, scales arranged under said pockets adapted to support receptacles, means for filling said pockets, mechanism for opening the valves to deliver the charges into the receptacles, feeding devices operative after the receptacles have received the aforesaid charges for forcibly feeding material into the receptacles through the pockets, and mechanism actuated by the balancing of said scales for closing said valves.

78. In a machine for filling receptacles, the combination of a revoluble structure provided with a plurality of scales in circular arrangement thereon and a plurality of charging pockets arranged above said scales, respectively, means for filling said charging pockets successively as they reach a certain point in their rotary movement, valves to close said pockets at the bottom, mechanism for opening said valves so that the charges of material in said pockets are deposited in the receptacles while on the scales, feeding devices for feeding additional material into said receptacles through the pockets, and means actuated by the balancing of the scales for closing said valves.

79. In a machine for filling receptacles, the combination of a revoluble structure provided with a plurality of scales in circular arrangement thereon and a plurality of charging pockets arranged above said scales respectively, means for filling said charging pockets successively as they reach a certain point in their rotary movement, valves to close said pockets at the bottoms, means for placing receptacles on said scales, mechanism for opening said valves so that the charges of material in said pockets are deposited in the receptacles while on the scales, feeding devices for feeding additional material into said receptacles through the pockets, means actuated by the balancing of the scales for closing said valves, and means for removing the filled receptacles from the scales.

80. In a machine for filling receptacles, the combination of a revoluble structure provided with a plurality of scales in circular arrangement thereon and a plurality of charging pockets arranged above said scales, respectively, means for filling said charging pockets successively as they reach a certain point in their rotary movement, valves to close said pockets at the bottom, mechanism for opening said valves so that the charges of material in said pockets are deposited in the receptacles while on the scales, feeding devices for feeding additional material into said receptacles through the pockets, means actuated by the balancing of the scales for closing said valves, and means for varying the amount of the charges introduced into said charging pockets.

81. In a machine for filling receptacles, the combination of a revoluble structure provided with a plurality of scales in circular arrangement thereon and a plurality of charging pockets arranged above said scales, respectively, means for filling said charging pockets successively as they reach a certain point in their rotary movement, valves to close said pockets at the bottom, mechanism for opening said valves so that the charges of material in said pockets are deposited in the receptacles while on the scales, feeding devices for feeding additional material into said receptacles through the pockets, means actuated by the balancing of the scales for closing said valves, and means operative when a scale has reached a certain point without balancing for closing the valve of the charging pocket associated therewith.

82. In a machine for filling receptacles, the combination of a revoluble structure provided with a plurality of scales in circular arrangement thereon and a plurality of charging pockets arranged above said scales, respectively, means for filling said charging pockets successively as they reach a certain point in their rotary movement, valves to close said pockets at the bottom, mechanism for opening said valves so that the charges of material in said pockets are deposited in the receptacles while on the scales, feeding devices for feeding additional material into said receptacles through the pockets, means actuated by the balancing of the scales for closing said valves, and means operative when a scale has reached a certain point without balancing for closing the valve of the charging pocket associated therewith and for giving an alarm.

83. In a machine for filling receptacles, the combination of a revoluble structure provided with a plurality of scales in circular arrangement thereon and a plurality of charging pockets arranged above said scales respectively, means for filling said charging pockets successively as they reach a certain point in their rotary movement, valves to close said pockets at the bottoms, means for placing receptacles on said scales, mechanism for opening said valves so that the charges of material in said pockets are deposited in the receptacles while on the scales, feeding devices for feeding additional material into said receptacles through the pockets, means actuated by the balancing of the scales for closing said valves, means for removing the filled receptacles from the scales, said scales comprising scale pans adapted to receive the receptacles, and means for holding said scale pans out of operating contact with the scale during the placing thereon of the empty receptacle, the deposit of the charge therein, and the removal of the filled receptacle from the scale pan.

84. In a machine for filling receptacles, the combination of a revoluble structure provided with a plurality of scales in circular arrangement thereon, and a plurality of charging pockets arranged above said scales, respectively, means for filling said charging pockets successively as they reach a certain point in their rotary movement, valves to close said pockets at the bottom, mechanism for opening said valves so that the charges of material in said pockets are deposited in the receptacles while on the scales, means for feeding additional material into said receptacles comprising a supply vessel on the revoluble structure, feeding devices for feeding material therefrom into the pockets, and means actuated by the balancing of the scales for closing said valves.

85. In a machine for filling receptacles, the combination of a revoluble structure provided with a plurality of scales in circular arrangement thereon and a plurality of charging pockets arranged above said scales, respectively, means for filling said charging pockets, successively as they reach a certain point in their rotary movement, valves to close said pockets at the bottom, mechanism for opening said valves so that the charges of material in said pockets are deposited in the receptacles while on the scales, means for thereafter partially closing said valves, feeding devices for feeding additional material into said receptacles through the pockets, and means actuated by the balancing of the scales for closing said valves.

86. In a machine for filling receptacles, the combination of a revoluble structure provided with a plurality of scales in circular arrangement thereon and a plurality of charging pockets arranged above said scales respectively, means for filling said charging pockets successively as they reach a certain point in their rotary movement, valves to close said pockets at the bottom, mechanism conditioned, in each case, on the presence of a receptacle on said scale, for opening the valve of the pocket associated with said scale, feeding devices for feeding additional material into said receptacles through the pockets, and means actuated by the balancing of the scales for closing said valves.

FREDRICK L. JEFFERIES.
WILLIAM SPAIN.